United States Patent
Gotoh et al.

(10) Patent No.: US 7,512,962 B2
(45) Date of Patent: *Mar. 31, 2009

(54) MULTICHANNEL DISPLAY DATA GENERATING APPARATUS, MEDIUM, AND INFORMATIONAL SET

(75) Inventors: Shoichi Gotoh, Ibaraki (JP); Yoshiki Kuno, Moriguchi (JP); Hiroyuki Iitsuka, Katano (JP); Masazumi Yamada, Osaka (JP); Ryogo Yanagisawa, Osaka (JP); Hirotoshi Uehara, Hirakata (JP); Toshiaki Tsuji, Kobe (JP)

(73) Assignee: Panasonic Corporation, Osaka (JP)

( * ) Notice: Subject to any disclaimer, the term of this patent is extended or adjusted under 35 U.S.C. 154(b) by 588 days.

This patent is subject to a terminal disclaimer.

(21) Appl. No.: 11/129,088

(22) Filed: May 13, 2005

(65) Prior Publication Data
US 2005/0259952 A1    Nov. 24, 2005

Related U.S. Application Data

(62) Division of application No. 09/687,584, filed on Oct. 13, 2000, now Pat. No. 7,236,531.

(30) Foreign Application Priority Data
Oct. 15, 1999   (JP) ................... 11-294583

(51) Int. Cl.
G06F 3/00 (2006.01)
G06F 13/00 (2006.01)
H04N 5/445 (2006.01)

(52) U.S. Cl. .......... 725/37; 348/563; 348/564; 348/565; 348/566; 348/588; 725/151

(58) Field of Classification Search ............ 725/35; 348/563–566, 588
See application file for complete search history.

(56) References Cited

U.S. PATENT DOCUMENTS
5,237,418 A    8/1993    Kaneko (Continued)

FOREIGN PATENT DOCUMENTS
EP    0 566 092 A    10/1993

(Continued)

OTHER PUBLICATIONS
European Search Report for EP 00 12 2470, dated Feb. 12, 2004.

(Continued)

Primary Examiner—Scott Beliveau
Assistant Examiner—Kunal Langhnoja
(74) Attorney, Agent, or Firm—RatnerPrestia

(57) ABSTRACT

A multichannel display data generating apparatus for generating data for displaying AV data on a multiscreen has a plurality of screens for displaying AV data of a plurality of channels, said apparatus comprising:
input means for inputting AV data of a plurality of channels being transferred using a transport packet of a transport stream;
a smaller number of PCR extracting means for extracting in a time-sharing mode the PCR of a plurality of channels displayed on said plurality of screens than the number of said plurality of screens;
the same number of PLL means for establishing PLL synchronization by using said extracted PCR as the number of said plurality of screens;
the same number of STC (system time clock) counter means for counting the times of the channels displayed on said plurality of screens by using the oscillation frequency of said PLL means as the number of said plurality of screens;
AV decoding means for AV-decoding the AV data of the channels displayed on said multiscreen in AV synchronization with said STC counter means; and
output means for outputting said AV-decoded AV data; and wherein
said output AV data is displayed on said multiscreen.

6 Claims, 18 Drawing Sheets

U.S. PATENT DOCUMENTS

| | | | |
|---|---|---|---|
| 5,442,452 A | | 8/1995 | Ryu |
| 5,633,683 A | * | 5/1997 | Rosengren et al. ..... 375/240.01 |
| 5,699,392 A | | 12/1997 | Dokic |
| 5,828,414 A | | 10/1998 | Lookabaugh et al. |
| 5,844,552 A | * | 12/1998 | Gaughan et al. .............. 725/37 |
| 5,859,949 A | | 1/1999 | Yanagihara |

FOREIGN PATENT DOCUMENTS

| | | |
|---|---|---|
| EP | 0 703 713 A | 3/1996 |
| EP | 0 757 495 A | 2/1997 |
| EP | 0 778 710 A | 6/1997 |
| EP | 0 924 935 A | 6/1999 |
| EP | 924935 A2 * | 6/1999 |

OTHER PUBLICATIONS

European Search Report for EP 00 12 2470, dated Jul. 8, 2004.

Riemann, U.: "Der MPEG-2-Standard Generische Codierung fur Bewegtbilder und zugehoriger Audio-Information Multiplex-Spezifikation fur die flexible Ubertragung digitaler Datenstrome", Fernseh und Kinotechnik, VDE Verlag GHBH, Berlin, DE, vol. 48, No. 10, Oct. 1, 1994, pp. 545-550, 553.

* cited by examiner

MULTICHANNEL DISPLAY DATA GENERATING APPARATUS, MEDIUM, AND INFORMATIONAL SET

This application is a divisional of U.S. patent application Ser. No. 09/687,584, filed Oct. 13, 2000, now U.S. Pat. No. 7,236,531 the contents of which are incorporated herein by reference.

BACKGROUND OF THE INVENTION

1. Field of the Invention

The present invention relates to a multichannel display data generating apparatus which generates data for displaying AV data on a multiscreen comprising a plurality of screens displaying a plurality of channels of AV (audio-visual) data, a medium, and an informational set.

2. Description of the Related Art

Digital broadcasting has been conducted in various broadcasting forms such as BS (broadcasting satellite) broadcasting, CS (communications satellite) broadcasting, and CATV (cable television) broadcasting. These forms of broadcasting are generally conducted in multiple channels. Thus, there is broader option for selecting a program to be viewed.

Such circumstances has accelerated the spread of multichannel display in which a television screen for viewing programs comprises a plurality of screens which display a plurality of channels of AV data simultaneously.

Typical multichannel display comprises a main screen for displaying the video image of an AV data the voice of which is output from a main speaker and a subsidiary screen for displaying the video image of another AV data the voice of which is not output from the main speaker. The multichannel display permits the viewing of video images being broadcast simultaneously in a plurality of channels. For example, while watching a movie displayed on the main screen, it is possible to view a broadcast of a baseball game displayed on the subsidiary screen thereby to seize the progress of the game.

As such, the multichannel display permits the simultaneous viewing of programs being broadcast in a plurality of channels. Thus, it is concluded that the multichannel display is a programs-displaying method suitable for multichannel broadcasting.

A prior-art multichannel display data generating apparatus for generating data for performing such multichannel display is described below with an example of an STB (set-top box).

FIG. 17 is a block diagram of the configuration of an STB for generating data for performing multichannel display. FIG. 18 illustrates an example of a television screen which displays the data for performing multichannel display generated by the STB of FIG. 17.

In FIG. 18, a television screen 103 consists of four screens. A main screen 104 is a screen for displaying a video the voice of which is output from a main speaker. Subsidiary screens 105, 106, 107 are screens for displaying videos the voices of which are not output from the main speaker.

Returning to FIG. 17, an STB 100 comprises a BS tuner 4, an IEEE1394 interface 5, a transport decoder 101, and an AV decoder 102.

The transport decoder 101 includes four PCR extracting sections 11a-d and four PLL (phase-locked loop) sections 12a-d. The AV decoder 102 includes four STC (system time clock) counters 13a-d.

The BS tuner 4 is means for receiving a BS broadcast. The IEEE1394 interface 5 is means for exchanging data and commands with external devices through an IEEE1394 bus 3 on the outside of the STB 100. The transport decoder 101 is means for separating MPEG2 transport stream transferred via the IEEE1394 bus. The AV decoder 102 is means for expanding MPEG2-compressed AV data and generating analog signals.

The PCR extracting sections 11a-d are means for extracting PCR (program clock reference) from the AV data of each channel to be displayed on each screen of the television screen 103. The PLL sections 12a-d are means for establishing PLL synchronization using the PCR extracted by the PCR extracting sections 11a-d. In other words, these are means for synchronizing the oscillation frequencies with those of the oscillators of 27-MHz frequency used by the encoders in the broadcasting stations as a time standard during the encoding of the data. The STC counters 13a-d are means for reproducing the times of day used by the encoders in the broadcasting stations during the encoding of the data, using the 27-MHz clock signals obtained by the PLL sections 12a-d and the PCR values extracted by the PCR extracting sections 11a-d.

The STB 100 is connected to an antenna 6. The IEEE1394 interface 5 is connected to the IEEE1394 bus 3, to which a CS tuner 7 and a DVHS 8 are also connected.

The operation of such a prior art STB 100 is described below.

Broadcast waves transmitted from broadcasting stations are converted to electric signals by the antenna 6. The BS tuner 4 then receives and demodulates the broadcast waves having been converted to the electric signals. Here, program data is sent using the transport packets of MPEG2 transport stream.

The demodulated data is transferred to the transport decoder 101.

The transport decoder 101 separates the MPEG2 transport stream. At that time, the transport decoder 101 performs the following process.

That is, the transport decoder 101 extracts PCR from the AV data of each channel to be displayed on each screen of the television screen 103. The television screen 103 comprises four screens in total of the main screen 104 and the three subsidiary screens 105-107. Thus, PCR is extracted from the AV data of the channels to be displayed on these four screens.

More particularly, the PCR extracting section 11a extracts the PCR of the AV data to be displayed on the main screen 104. The PCR extracting section 11b extracts the PCR of the AV data to be displayed on the subsidiary screen 105. The PCR extracting section 11c extracts the PCR of the AV data to be displayed on the subsidiary screen 106. The PCR extracting section 11d extracts the PCR of the AV data to be displayed on the subsidiary screen 107.

The PLL sections 12a-d then establish PLL synchronization, using the extracted PCR of the respective channels. That is, the PLL sections synchronize the oscillation frequencies with those of the oscillators of 27-MHz frequency used by the encoders in the broadcasting stations as a time standard during the encoding of the data. The PLL section 12a establishes PLL synchronization with the channel to be displayed on the main screen 104. Similarly, the PLL sections 12b, 12c, 12d establish PLL synchronization with the channels to be displayed on the subsidiary screens 105, 106, 107, respectively.

The STC counters 13a-d reproduce the times of day used by the encoders in the broadcasting stations during the encoding of the data, using the 27-MHz clock signals obtained by the PLL sections 12a-d and the PCR values extracted by the PCR extracting sections 11a-d. That is, the STC counter 13a reproduces the time of the channel to be displayed on the main screen 104. Similarly, the STC counters 13b, 13c, 13d reproduce the times of the channels to be displayed on the subsidiary screens 105, 106, 107, respectively. Using these STC counters 13a-d and establishing AV synchronization with respective channels, the AV decoder 102 expands the compressed data in MPEG format and converts them to analog signals. That is, in the timing that the PTS (presentation time stamp) described in the data coincides with the time indicated by the STC counter 13 of that data channel, the part of the data is expanded and converted to analog signals.

The analog signals obtained by the above-mentioned process are output as a video signal and an audio signal. Video images are displayed on the four screens: the main screen 104 and the three subsidiary screens 105-107. The voice of the channel displayed on the main screen 104 is output from the main speaker.

As such, the prior art STB 100 have established AV synchronization with each channel independently using the PCR of the channel to be displayed on each screen of the multiscreen. That is, each channel was individually provided with a PCR extracting section, a PLL section, and an STC counter, and the process was performed on an each-screen basis. Accordingly, for a multiscreen consisting of four screens, the process was performed by four sets of PCR extracting sections, PLL sections, and STC counters, each set being provided for each channel.

However, since a prior-art multichannel display data generating apparatus comprises the same number of the sets of PCR extracting sections, PLL sections, and STC counters as the number of the screens the AV synchronization of each of which is to be established independently, there is a problem that the scale of the circuitry of PCR extracting sections and PLL sections becomes large and that the AV-synchronization control becomes complex.

SUMMARY OF THE INVENTION

With the consideration of the above-mentioned problem, an object of the present invention is to provide a multichannel display data generating apparatus having not-so-large circuitry scale, a medium, and an informational set.

One aspect of the present invention is a multichannel display data generating apparatus for generating data for displaying AV data on a multiscreen comprising a plurality of screens for displaying AV data of a plurality of channels, said apparatus comprising:

input means for inputting AV data of a plurality of channels being transferred using a transport packet of a transport stream;

a smaller number of PCR extracting means for extracting in a time-sharing mode the PCR of a plurality of channels displayed on said plurality of screens than the number of said plurality of screens;

the same number of PLL means for establishing PLL synchronization by using said extracted PCR as the number of said plurality of screens;

the same number of STC (system time clock) counter means for counting the times of the channels displayed on said plurality of screens by using the oscillation frequency of said PLL means as the number of said plurality of screens;

AV decoding means for AV-decoding the AV data of the channels displayed on said multiscreen in AV synchronization with said STC counter means; and output means for outputting said AV-decoded AV data; and wherein said output AV data is displayed on said multiscreen.

Another aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

PCR extracting means for extracting the PCR of the channel displayed on said main screen among said plurality of channels;

PLL means for establishing PLL synchronization by using said extracted PCR;

STC counter means for counting the time of the channel displayed on said main screen by using the oscillation frequency of said PLL means;

AV decoding means for AV-decoding the AV data of the channel displayed on said main screen in AV synchronization with said STC counter means and for AV-decoding the AV data of the channel displayed on said subsidiary screen out of AV synchronization; and output means for outputting said AV-decoded AV data; and wherein said output AV data is displayed on said multiscreen.

Still another aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

one PCR extracting means for extracting the PCR of the channel displayed on said main screen among said plurality of channels and for extracting the PCR of the channel displayed on said subsidiary screen for a predetermined duration when a new channel is selected and the AV data of the channel is firstly displayed on said subsidiary screen;

PLL means for establishing PLL synchronization by using said extracted PCR;

STC counter means for counting the time of the channel displayed on said main screen by using the oscillation frequency of said PLL means and for reproducing the time of the channel displayed on said subsidiary screen by using the PCR for a predetermined duration when a new channel is selected and the AV data of the channel is firstly displayed on said subsidiary screen;

AV decoding means for AV-decoding the AV data of the channel displayed on said main screen in synchronization with said STC counter means and for AV-decoding the AV data of the channel displayed on said subsidiary screen in AV synchronization with the AV data of the channel for a predetermined duration when a new channel is selected and the AV data of the channel is firstly displayed on said subsidiary screen; and output means for outputting said AV-decoded AV data; and wherein said output AV data is displayed on said multiscreen.

Yet another aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

two PCR extracting means for extracting the PCR of the channel displayed on said main screen among said plurality of channels and the PCR of the candidate subsidiary screen for the next said main screen among said subsidiary screens;

two PLL means for establishing PLL synchronization with said extracted PCR of the channel displayed on said main screen and the PCR of the channel displayed on the candidate subsidiary screen for the next said main screen by using the oscillation frequency of said PLL means;

two STC counter means for counting the time of the channel displayed on said main screen and the time of the channel displayed on the candidate subsidiary screen for the next said main screen;

AV decoding means for AV-decoding the AV data of the channel displayed on said main screen and the AV data of the channel displayed on the candidate subsidiary screen for the next said main screen in AV synchronization with said STC counter means and for AV-decoding the AV data of the channels displayed on the other subsidiary screens out of AV synchronization; and output means for outputting said AV-decoded AV data; and wherein said output AV data is displayed on said multiscreen.

The 5$^{th}$ invention of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

one PCR extracting means for extracting in a time-sharing mode the PCR of the channel displayed on said main screen and the PCR of the channel displayed on said subsidiary screen among said plurality of channels;

one PLL means for establishing PLL synchronization by using said extracted PCR of the channel displayed on said main screen;

the same number of STC counter means for counting the times of the channels displayed on said main screen and said subsidiary screen by using the oscillation frequency of said PLL means as the number of the screens of said multiscreen;

AV decoding means for AV-decoding in AV synchronization with said STC counter means; and output means for outputting said AV-decoded AV data; and wherein said output AV data is displayed on said multiscreen.

Still yet another aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

two PCR extracting means for extracting the PCR of the channel displayed on said main screen among said plurality of channels and the PCR of the channel displayed on said candidate subsidiary screen for the next said main screen among said subsidiary screens;

one PLL means for establishing PLL synchronization with the channel displayed on said main screen by using said extracted PCR;

one STC counter means for counting the time of the channel displayed on said main screen by using the oscillation frequency of said PLL means;

AV decoding means for AV-decoding the AV data of the channel displayed on said main screen in AV synchronization with said STC counter means and for AV-decoding the AV data of the channel displayed on said subsidiary screen out of AV synchronization; and output means for outputting said AV-decoded AV data; and wherein when the channel of said candidate subsidiary screen for the next said main screen is changed to a main screen, said PLL means establishes PLL synchronization with the channel by using the PCR having been extracted, and said STC counter means reproduces the time of the channel, and wherein said output AV data is displayed on said multiscreen.

A further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

two PCR extracting means for extracting the PCR of the channel displayed on said main screen among said plurality of channels and the PCR of the candidate subsidiary screen for the next said main screen among said subsidiary screens;

one PLL means for establishing PLL synchronization with the channel displayed on said main screen by using said extracted PCR;

two STC counter means for counting the time of the channel displayed on said main screen and the time of the channel displayed on the candidate subsidiary screen for the next said main screen among said subsidiary screens by using the oscillation frequency of said PLL means;

AV decoding means for AV-decoding the AV data of the channel displayed on said main screen and the AV data of the channel displayed on the candidate subsidiary screen for the next said main screen in AV synchronization with said STC counter means and for AV-decoding the AV data of the channels displayed on the other subsidiary screens out of AV synchronization; and output means for outputting said AV-decoded AV data; and wherein said output AV data is displayed on said multiscreen.

A still further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

the same number of PCR extracting means for extracting the PCR of the channels displayed on said main screen and said subsidiary screen among said plurality of channels as the number of screens of said multiscreen;

one PLL means for establishing PLL synchronization with the channel displayed on said main screen by using said extracted PCR;

the same number of STC counter means for counting the times of the channels displayed on said main screen and said subsidiary screen by using the oscillation frequency of said PLL means as the number of screens of said multiscreen;

AV decoding means for AV-decoding the AV data of the channels displayed on said main screen and said subsidiary screen in AV synchronization with said STC counter means; and output means for outputting said AV-decoded AV data; and wherein said output AV data is displayed on said multiscreen.

The 9$^{th}$ invention of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

the same number of PCR extracting means for extracting the PCR of the channels displayed on said main screen and said subsidiary screen among said plurality of channels as the number of screens of said multiscreen;

one PLL means for establishing PLL synchronization with the channel displayed on said main screen by using said extracted PCR;

one STC counter means for counting the time of the channel displayed on said main screen by using the oscillation frequency of said PLL means;

difference calculating means for calculating the difference from the value of said STC counter means when the PCR of the AV data of the channel displayed on said subsidiary screen arrives;

AV decoding means for AV-decoding the AV data of the channel displayed on said main screen in AV synchronization with said STC counter means and for AV-decoding the AV data of the other channels displayed on the subsidiary screens in AV synchronization with the sum of said difference and the counter value of said STC counter means; and output means for outputting said AV-decoded AV data; and wherein said output AV data is displayed on said multiscreen.

A yet further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:

input means for inputting AV data of a plurality of channels being transferred using a transport packet of a transport stream;

the same number of PCR extracting means for extracting the PCR of the channels displayed on said main screen and said subsidiary screen among said plurality of channels as the number of screens of said multiscreen;

one PLL means for establishing PLL synchronization with the channel displayed on said main screen by using said extracted PCR;

one STC counter means for counting the time of the channel displayed on said main screen by using the oscillation frequency of said PLL means;

difference calculating means for calculating the difference from the value of said STC counter means when the PCR of the AV data of the channel displayed on said subsidiary screen arrives;

time-stamp rewriting means for rewriting the value of the time stamp of the AV data of the channel displayed on said subsidiary screen into the value of the time stamp subtracted by said difference;

AV decoding means for AV-decoding the AV data of the channel displayed on said main screen in AV synchronization with said STC counter means and for AV-decoding the AV data of the other channels displayed on the subsidiary screens in AV synchronization with said rewritten time stamp and said STC counter means; and output means for outputting said AV-decoded AV data; and wherein said output AV data is displayed on said multiscreen.

A still yet further aspect of the present invention is a multichannel display data generating apparatus, the number of said PCR extracting means being one instead of two, said PCR extracting means extracting in a time-sharing mode the PCR of the channel displayed on said main screen among said plurality of channels and the PCR of the candidate subsidiary screen for the next said main screen among said subsidiary screens.

An additional aspect of the present invention is a multichannel display data generating apparatus, wherein said PLL means comprises a counter for counting by using the oscillation frequency generated by an oscillator provided therein, calculates and retains a first difference between the value of the PCR of a channel to be PLL-synchronized firstly extracted by said PCR extracting means and the counter value of said counter at the time of the extraction of the PCR by said PCR extracting means, calculates a second difference between the value of the PCR of said channel to be PLL-synchronized secondly or subsequently extracted by said PCR extracting means and the counter value of said counter at the time of the extraction of the PCR by said PCR extracting means, and controls the oscillation frequency so as to reduce the difference between said first difference and said second difference.

Another additional aspect of the present invention is a multichannel display data generating apparatus for generating data for displaying AV data on a multiscreen comprising a plurality of screens for displaying AV data of a plurality of channels, wherein each of predetermined transmission units to which said plurality of channels belong includes identical PCR, said apparatus comprising:

input means for inputting AV data of said plurality of channels being transferred using a transport packet of a transport stream;

a smaller number of PCR extracting means for extracting, unit by unit in a time-sharing mode, the PCR of said predetermined transmission units to which said plurality of channels belong than the number of said plurality of screens or the number of display transmission units defined by the number of said predetermined transmission units to which said plurality of channels displayed on said plurality of screens belong;

the same number of PLL means for establishing PLL synchronization at least unit by unit by using said extracted PCR as the number of said plurality of screens or said number of display transmission units;

the same number of STC counter means for counting the time of each of said predetermined transmission units to which the channels displayed on said plurality of screens belong by using the oscillation frequency of said PLL means as the number of said plurality of screens or said number of display transmission units;

AV decoding means for AV-decoding the AV data of the channels displayed on said plurality of screens in AV synchronization with said STC counter means corresponding to said predetermined transmission units to which the channels displayed on said plurality of screens belong; and output means for outputting said AV-decoded AV data; and wherein said output AV data is displayed on said multiscreen.

Still another additional aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

PCR extracting means for extracting the PCR of said predetermined transmission unit to which the channel displayed on said main screen among said plurality of channels belongs;

PLL means for establishing PLL synchronization by using said extracted PCR;

STC counter means for counting the time of said predetermined transmission unit to which the channel displayed on said main screen by using the oscillation frequency of said PLL means;

AV decoding means for AV-decoding the AV data of the channel included in said predetermined transmission unit to which the channel displayed on said main screen among said plurality of screens belongs in AV synchronization with said STC counter means and for AV-decoding the AV data of the channel displayed on said subsidiary screen which is not included in said predetermined transmission unit to which the channel displayed on said main screen belongs out of AV synchronization; and output means for outputting said AV-decoded AV data; and wherein said output AV data is displayed on said multiscreen.

Yet another additional aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

one PCR extracting means for extracting the PCR of said predetermined transmission unit to which the channel displayed on said main screen among said plurality of channels belongs and for extracting the PCR of said predetermined transmission unit to which the channel displayed on said subsidiary screen belongs for a predetermined duration when a new channel is selected and the AV data of the channel is firstly displayed on said subsidiary screen;

PLL means for establishing PLL synchronization by using said extracted PCR;

STC counter means for counting the time of said predetermined transmission unit to which the channel displayed on said main screen belongs by using the oscillation frequency of said PLL means and for reproducing the time of the channel displayed on said subsidiary screen by using the PCR of said predetermined transmission unit to which the channel belongs for a predetermined duration when a new channel is selected and the AV data of the channel is firstly displayed on said subsidiary screen;

AV decoding means for AV-decoding the AV data of the channel included in said predetermined transmission unit to which the channel displayed on said main screen among said plurality of channels belongs in synchronization with said STC counter means and for AV-decoding the AV data of the channel displayed on said subsidiary screen in AV synchronization with the AV data of the channel included in said predetermined transmission unit to which the channel belongs for a predetermined duration when a new channel is selected and the AV data of the channel is firstly displayed on said subsidiary screen; and output means for outputting said AV-decoded AV data; and wherein said output AV data is displayed on said multiscreen.

Still yet another additional aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

two PCR extracting means for extracting the PCR of said predetermined transmission unit to which the channel displayed on said main screen among said plurality of channels belongs and the PCR of said predetermined transmission unit to which the candidate subsidiary screen for the next said main screen among said subsidiary screens belongs;

two PLL means for establishing PLL synchronization with said extracted PCR of said predetermined transmission unit to which the channel displayed on said main screen belongs and said extracted PCR of said predetermined transmission unit to which the channel displayed on the candidate subsidiary screen for the next said main screen belongs;

two STC counter means for counting the time of said predetermined transmission unit to which the channel displayed on said main screen belongs and the time of said predetermined transmission unit to which the channel displayed on the candidate subsidiary screen for the next said main screen belongs by using the oscillation frequency of said PLL means;

AV decoding means for AV-decoding the AV data of the channel included in said predetermined transmission unit to which the channel displayed on said main screen among said plurality of channels belongs and the AV data of the channel included in said predetermined transmission unit to which the channel displayed on the candidate subsidiary screen belongs for the next said main screen in AV synchronization with said STC counter means and for AV-decoding the AV data of the channels displayed on the other subsidiary screens out of AV synchronization; and output means for outputting said AV-decoded AV data; and wherein said output AV data is displayed on said multiscreen.

A further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

one PCR extracting means for extracting, unit by unit in a time-sharing mode, the PCR of said predetermined transmission unit to which the channel displayed on said main screen among said plurality of channels belongs and the PCR of said predetermined transmission unit to which the channel displayed on said subsidiary screen among said plurality of channels belongs;

one PLL means for establishing PLL synchronization by using the PCR of said predetermined transmission unit to which the channel displayed on said main screen belongs among said PCR extracted unit by unit;

the same number of STC counter means for counting the times of said predetermined transmission units to which the channels displayed on said main screen and said subsidiary screen by using the oscillation frequency of said PLL means as the number of the screens of said multiscreen or the number of display transmission units defined by the number of said predetermined transmission units to which said plurality of channels displayed on said multiscreen belong;

AV decoding means for AV-decoding the AV data of the channels displayed on said plurality of channels in AV synchronization with said STC counter means corresponding to said predetermined transmission units to which the channels displayed on said plurality of channels belong; and output means for outputting said AV-decoded AV data; and wherein said output AV data is displayed on said multiscreen.

A still further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

two PCR extracting means for extracting the PCR of said predetermined transmission unit to which the channel displayed on said main screen among said plurality of channels belongs and the PCR of said predetermined transmission unit to which the channel displayed on said candidate subsidiary screen for the next said main screen among said subsidiary screens belongs;

one PLL means for establishing PLL synchronization with the channel displayed on said main screen by using said extracted PCR;

one STC counter means for counting the time of said predetermined transmission unit to which the channel displayed on said main screen belongs by using the oscillation frequency of said PLL means;

AV decoding means for AV-decoding the AV data of the channel included in said predetermined transmission unit to which the channel displayed on said main screen among said plurality of channels belongs in AV synchronization with said STC counter means and for AV-decoding the AV data of the channel displayed on said subsidiary screen which is not included in said predetermined transmission unit to which the channel displayed on said main screen belongs out of AV synchronization; and output means for outputting said AV-decoded AV data; and wherein when the channel of said candidate subsidiary screen for the next said main screen is changed to a main screen, said PLL means establishes PLL synchronization with said predetermined transmission unit to which the channel belongs by using the PCR having been extracted, and said STC counter means reproduces the time of said predetermined transmission unit to which the channel belongs, and wherein said output AV data is displayed on said multiscreen.

A yet further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

two PCR extracting means for extracting the PCR of said predetermined transmission unit to which the channel displayed on said main screen among said plurality of channels belongs and the PCR of said predetermined transmission unit to which the candidate subsidiary screen for the next said main screen among said subsidiary screens belongs;

one PLL means for establishing PLL synchronization with said predetermined transmission unit to which the channel displayed on said main screen belongs by using said extracted PCR;

two STC counter means for counting the time of said predetermined transmission unit to which the channel displayed on said main screen belongs and the time of said predetermined transmission unit to which the channel displayed on the candidate subsidiary screen for the next said main screen among said subsidiary screens belongs by using the oscillation frequency of said PLL means;

AV decoding means for AV-decoding the AV data of the channel included in said predetermined transmission unit to which the channel displayed on said main screen among said plurality of channels belongs and the AV data of the channel included in said predetermined transmission unit to which the channel displayed on the candidate subsidiary screen for the next said main screen belongs in AV synchronization with said STC counter means and for AV-decoding the AV data of the channels displayed on the other subsidiary screens out of AV synchronization; and output means for outputting said AV-decoded AV data; and wherein said output AV data is displayed on said multiscreen.

A still yet further aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

the same number of PCR extracting means for extracting, unit by unit, the PCR of said predetermined transmission units to which the channels displayed on said main screen and said subsidiary screen among said plurality of channels belong as the number of screens of said multiscreen or the number of display transmission units defined by the number of said predetermined transmission units to which said plurality of channels displayed on said multiscreen belong;

one PLL means for establishing PLL synchronization with the channel displayed on said main screen by using said extracted PCR;

the same number of STC counter means for counting the times of said predetermined transmission units to which the channels displayed on said main screen and said subsidiary screen belong by using the oscillation frequency of said PLL means as the number of screens of said multiscreen or said number of display transmission units;

AV decoding means for AV-decoding the AV data of the channels included in said predetermined transmission units to which the channels displayed on said main screen and said subsidiary screen among said plurality of channels belong in AV synchronization with said STC counter means; and output means for outputting said AV-decoded AV data; and wherein said output AV data is displayed on said multiscreen.

Another aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

the same number of PCR extracting means for extracting the PCR of said predetermined transmission units to which the channels displayed on said main screen and said subsidiary screen among said plurality of channels belong as the number of screens of said multiscreen or the number of display transmission units defined by the number of said predetermined transmission units to which said plurality of channels displayed on said multiscreen belong;

one PLL means for establishing PLL synchronization with said predetermined transmission unit to which the channel displayed on said main screen belongs by using said extracted PCR;

one STC counter means for counting the time of said predetermined transmission unit to which the channel displayed on said main screen belongs by using the oscillation frequency of said PLL means;

difference calculating means for calculating the difference from the value of said STC counter means when the PCR of the AV data of the channel included in said predetermined transmission unit to which the channel displayed on said subsidiary screen belongs arrives;

AV decoding means for AV-decoding the AV data of the channel included in said predetermined transmission unit to which the channel displayed on said main screen belongs in AV synchronization with said STC counter means and for AV-decoding the AV data of the other channels displayed on the subsidiary screens in AV synchronization with the sum of said difference and the counter value of said STC counter means; and output means for outputting said AV-decoded AV data; and wherein said output AV data is displayed on said multiscreen.

Still another aspect of the present invention is a multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, wherein each of predetermined transmission units to which said plurality of channels belong includes identical PCR, said apparatus comprising:

input means for inputting AV data of a plurality of channels being transferred using a transport packet of a transport stream;

the same number of PCR extracting means for extracting, unit by unit, the PCR of said predetermined transmission units to which the channels displayed on said main screen and said subsidiary screen among said plurality of channels belong as the number of screens of said multiscreen or the number of display transmission units defined by the number of said predetermined transmission units to which said plurality of channels displayed on said multiscreen belong;

one PLL means for establishing PLL synchronization with said predetermined transmission unit to which the channel displayed on said main screen belongs by using said extracted PCR;

one STC counter means for counting the time of said predetermined transmission unit to which the channel displayed on said main screen belongs by using the oscillation frequency of said PLL means;

difference calculating means for calculating the difference from the value of said STC counter means when the PCR of the AV data of said predetermined transmission unit to which the channel displayed on said subsidiary screen belongs arrives;

time-stamp rewriting means for rewriting the value of the time stamp of the AV data of the channel included in said predetermined transmission unit to which the channel displayed on said subsidiary screen belongs into the value of the time stamp subtracted by said difference;

AV decoding means for AV-decoding the AV data of the channel included in said predetermined transmission unit to which the channel displayed on said main screen among said plurality of channels belongs in AV synchronization with said STC counter means and for AV-decoding the AV data of the other channels displayed on the subsidiary screens in AV synchronization with said rewritten time stamp and said STC counter means; and output means for outputting said AV-decoded AV data; and wherein said output AV data is displayed on said multiscreen.

Yet another aspect of the present invention is a multichannel display data generating apparatus, the number of said PCR extracting means being one instead of two, said PCR extracting means extracting in a time-sharing mode the PCR of said predetermined transmission unit to which the channel displayed on said main screen among said plurality of channels belongs and the PCR of said predetermined transmission unit to which the candidate subsidiary screen for the next said main screen among said subsidiary screens belongs.

Still yet another aspect of the present invention is a multichannel display data generating apparatus inventions, wherein said PLL means comprises a counter for counting by using the oscillation frequency generated by an oscillator provided therein, calculates and retains a first difference between the value of the PCR of said predetermined transmission unit to which a channel to be PLL-synchronized belongs extracted firstly by said PCR extracting means and the counter value of said counter at the time of the extraction of the PCR by said PCR extracting means, calculates a second difference between the value of the PCR of said predetermined transmission unit to which said channel to be PLL-synchronized belongs extracted secondly or subsequently by said PCR extracting means and the counter value of said counter at the time of the extraction of the PCR by said PCR extracting means, and controls the oscillation frequency so as to reduce the difference between said first difference and said second difference.

The 25$^{th}$ invention of the present invention is a multichannel display data generating apparatus in accordance with any one of the 13$^{th}$-24$^{th}$ inventions, wherein said predetermined transmission unit is a transport stream.

An additional aspect of the present invention is a multichannel display data generating apparatus, wherein said predetermined transmission unit is a broadcasting station.

A further additional aspect of the present invention is a medium which is able to be processed by a computer and carrying a program and/or data for executing with a computer all or a portion of the function of all or a portion of means of the multichannel display data generating apparatus.

A still additional aspect of the present invention is an informational set which is a program and/or data for executing with a computer all or a portion of the function of all or a portion of means of the multichannel display data generating apparatus.

DESCRIPTION OF THE REFERENCE NUMERALS

Figure 1:
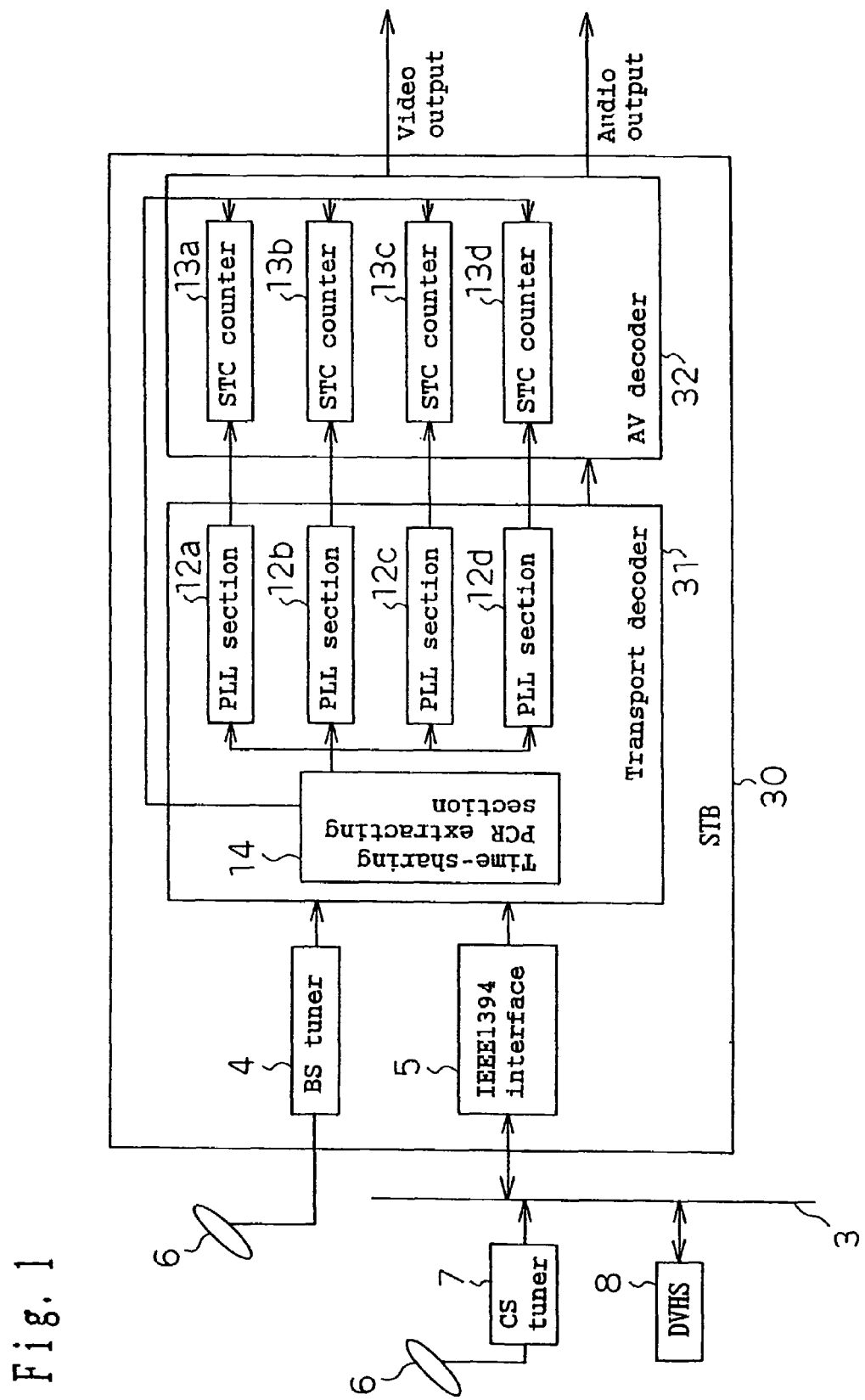
FIG. 1 is a block diagram showing the configuration of an STB according to the first embodiment of the present invention.

3 IEEE1394 bus
4 BS tuner
5 IEEE1394 interface
6 Antenna
7 CS tuner
8 DVHS
11 PCR extracting section
12$a$-$d$ PCR extracting section
12 PLL section
12$a$-$d$ PLL section
13 STC counter
13$a$-$d$ STC counter
14 Time-sharing PCR extracting section
30 STB
31 Transport decoder
32 AV decoder
33 STB
34 Transport decoder
35 AV decoder

DETAILED DESCRIPTION OF THE INVENTION

The embodiments of the present invention are described below with reference to the drawings.

First Embodiment

The first embodiment is described with reference to FIGS. 1 and 12.

FIG. 1 is a block diagram illustrating the configuration of an STB for generating data for performing multichannel display of the present embodiment.

Figure 12:
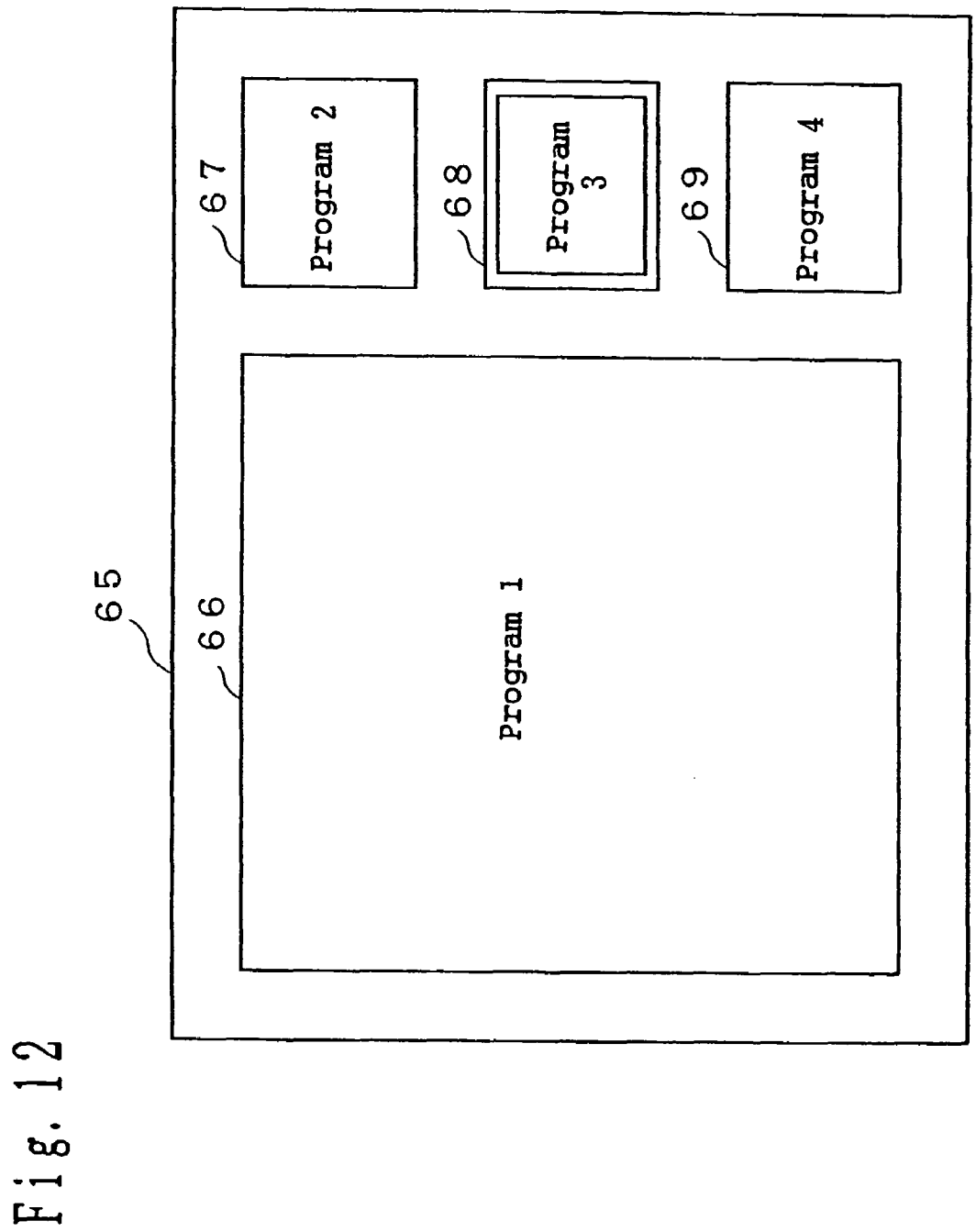
FIG. 12 illustrates an example of a television screen of the first to the tenth embodiments of the present invention.

FIG. 12 illustrates an example of a television screen displaying the multichannel display data generated by the STB 30 shown in FIG. 1.

In FIG. 12, a television screen 65 comprises four screens. A main screen 66 is a screen for displaying a video the voice of which is output from a main speaker. Subsidiary screens 67, 68, 69 are screens for displaying videos the voices of which are not output from the main speaker.

Returning to FIG. 1, the STB 30 comprises a BS tuner 4, an IEEE1394 interface 5, a transport decoder 31, and an AV decoder 32.

The transport decoder 31 includes a time-sharing PCR extracting section 14 and four PLL sections 12a-d. The AV decoder includes four STC counters 13a-d.

The BS tuner 4 is means for receiving a BS broadcast. The IEEE1394 interface 5 is means for exchanging data and commands with external devices through an IEEE1394 bus 3 on the outside of the STB 30. The transport decoder 31 is means for separating MPEG2 transport stream being transferred. The AV decoder 32 is means for expanding MPEG2-compressed AV data and generating analog signals.

The time-sharing PCR extracting section 14 is means for extracting PCR (program clock reference) in a time-sharing mode from the AV data of each channel to be displayed on each screen of the television screen 65. The PLL sections 12a-d are means for establishing PLL synchronization using the PCR extracted by the time-sharing PCR extracting section 14. In other words, these are means for synchronizing the oscillation frequencies with those of the oscillators of 27-MHz frequency used by the senders of the AV data as a time standard. The STC counters 13a-d are means for reproducing the times of day used by the senders of the AV data, using the 27-MHz clock signals obtained by the PLL sections 12a-d and the PCR values extracted by the time-sharing PCR extracting section 14.

The STB 30 is connected to an antenna 6. The IEEE1394 interface 5 is connected to the IEEE1394 bus 3, to which a CS tuner 7 and a DVHS 8 are also connected.

The operation of the present embodiment is described below.

Broadcast waves transmitted from broadcasting stations are converted to electric signals by the antenna 6. The BS tuner 4 then receives and demodulates the broadcast waves having been converted to the electric signals. Here, program data is sent using the transport packets of MPEG2 transport stream.

The demodulated data is transferred to the transport decoder 31.

The CS tuner 7 receives a CS broadcast through an antenna 6 and demodulates it. The CS tuner 7 then transfers the demodulated AV data through the IEEE1394 bus 3 to the IEEE1394 interface 5. The IEEE1394 interface 5 transfers the AV data to the transport decoder 31.

Further, the DVHS 8 transfers the data in replay to the transport decoder 31 via a path similar to that of the CS tuner 7.

The transport decoder 31 separates the MPEG2 transport stream. At that time, the transport decoder 31 performs the following process.

That is, the transport decoder 31 extracts PCR from the AV data of each channel to be displayed on each screen of the television screen 65. The television screen 65 comprises four screens in total of the main screen 66 and the three subsidiary screens 67-69. Thus, PCR is extracted from the AV data of the channels to be displayed on these four screens.

In the present embodiment, the main screen 66 displays a program 1 of a BS broadcasting channel, and the subsidiary screen 67 displays a program 2 of a BS broadcasting channel other than the channel displayed on the main screen. The subsidiary screen 68 displays a program 3 of a CS broadcasting channel. Further, the subsidiary screen 69 displays a specific program 4 among those being replayed by the DVHS 8. As such, the time standard of the AV data of a channel displayed on the television screen 65 differs from those of the other channels.

Thus, the time-sharing PCR extracting section 14 extracts the PCR of the AV data of the channel displayed on the main screen 66, the PCR of the AV data of the channel displayed on the subsidiary screen 67, the PCR of the AV data of the channel displayed on the subsidiary screen 68, and the PCR of the data of the channel displayed on the subsidiary screen 69, respectively in a time-sharing mode.

The PLL sections 12a-d then establish PLL synchronization, using the extracted PCR of each channel. That is, the PLL sections synchronize the oscillation frequencies with those of the oscillators of 27-MHz frequency used by the senders of the AV data as a time standard. The PLL section 12a establishes PLL synchronization with the channel to be displayed on the main screen 66. Similarly, the PLL sections 12b, 12c, 12d establish PLL synchronization with the channels to be displayed on the subsidiary screens 67, 68, 69, respectively.

The STC counters 13a-d reproduce the times of day used by the senders of the AV data, using the 27-MHz clock signals obtained by the PLL sections 12a-d and the PCR value extracted by the time-sharing PCR extracting section 14. That is, the STC counter 13a reproduces the time of the channel to be displayed on the main screen 66. Similarly, the STC counters 13b, 13c, 13d reproduce the times of the channels to be displayed on the subsidiary screens 67, 68, 69, respectively. Using these STC counters 13a-d and establishing AV synchronization with respective channels, the AV decoder 32 expands the compressed data in MPEG format and converts them to analog signals. That is, in the timing that the PTS (presentation time stamp) described in the data coincides with the time indicated by the STC counter 13 of that data channel, the part of the data is expanded and converted to analog signals.

The AV decoder 32 outputs the analog signals obtained by the above-mentioned process as a video signal and an audio signal. Video images are displayed on the four screens: the main screen 66 and the three subsidiary screens 67-69. The voice of the channel displayed on the main screen 66 is output from the main speaker.

As such, the extraction of PCR in a time-sharing mode permits the STB 30 to be provided with a smaller number of PCR extracting sections than the number of the screens of multiscreen. Therefore, the scale of the apparatus can be reduced.

Second Embodiment

The second embodiment is described below with reference to FIGS. 2 and 12.

Figure 2:
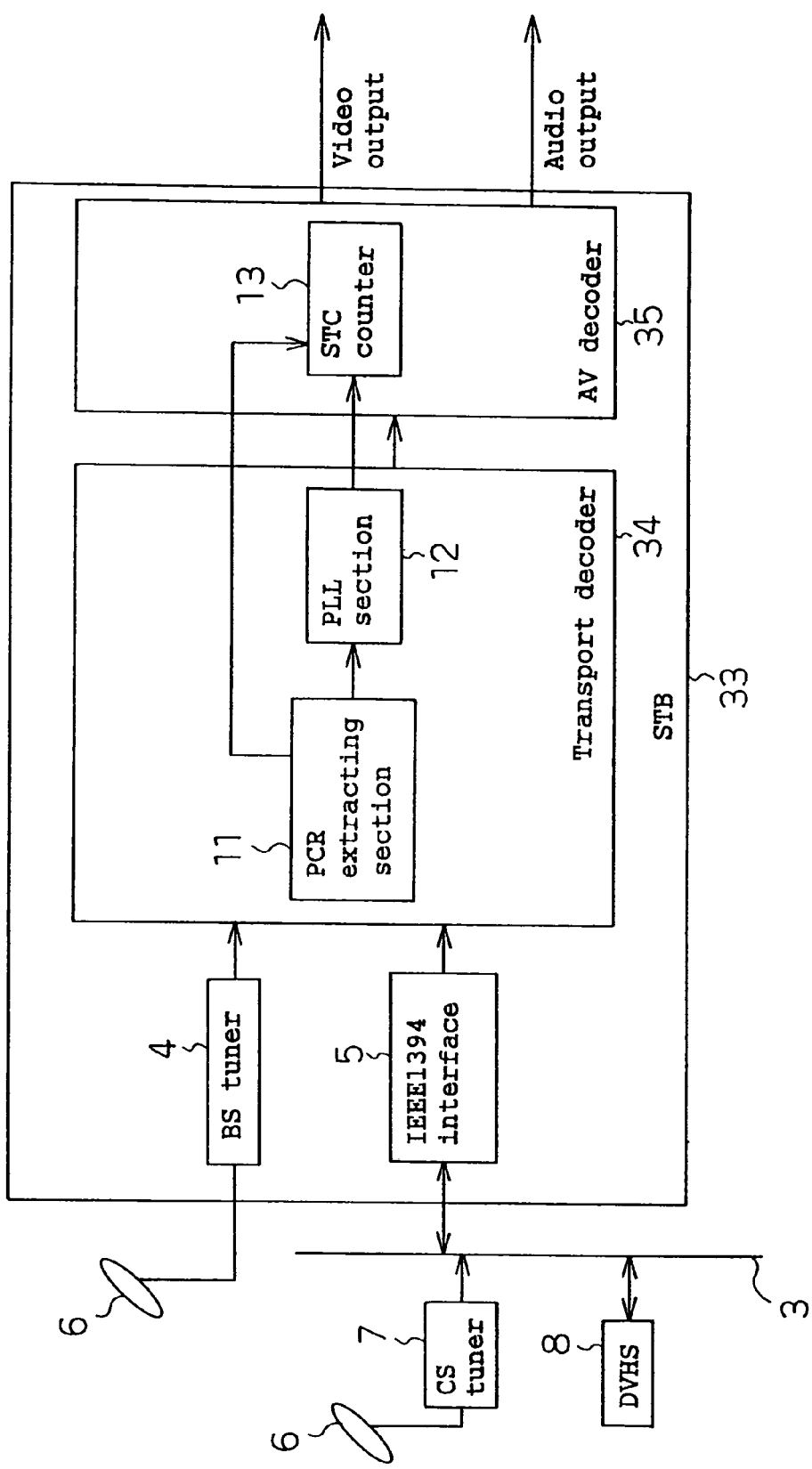
FIG. 2 is a block diagram showing the configuration of an STB according to the second embodiment of the present invention.

FIG. 2 is a block diagram illustrating the configuration of an STB for generating data for performing multichannel display of the present embodiment.

FIG. 12 illustrates an example of a television screen displaying the multichannel display data generated by the STB 33 shown in FIG. 2.

In FIG. 12, a television screen 65 comprises four screens. A main screen 66 is a screen for displaying a video the voice of which is output from a main speaker. Subsidiary screens 67, 68, 69 are screens for displaying videos the voices of which are not output from the main speaker. The main speaker is a speaker provided in the television set. A viewer appreciates a program by listening the voice output from the main speaker and watching the image displayed on the main screen 66. In addition, the television set comprises an earphone jack and the likes.

Returning to FIG. 2, the STB 33 comprises a BS tuner 4, an IEEE1394 interface 5, a transport decoder 34, and an AV decoder 35.

The transport decoder 34 includes a PCR extracting section 11 and a PLL section 12. The AV decoder includes an STC counter 13.

The BS tuner 4 is means for receiving a BS broadcast. The IEEE1394 interface 5 is means for exchanging data and commands with external devices through an IEEE1394 bus 3 on the outside of the STB 33. The transport decoder 34 is means for separating MPEG2 transport stream being transferred. The AV decoder 35 is means for expanding MPEG2-compressed AV data and generating analog signals.

The PCR extracting section 11 is means for extracting PCR from the AV data of the channel to be displayed on the main screen 66 of the television screen 65. The PLL section 12 is means for establishing PLL synchronization using the PCR extracted by the PCR extracting section 11. In other words, this is means for synchronizing the oscillation frequency with that of the oscillator of 27-MHz frequency used by the sender of the AV data as a time standard. The STC counter 13 is means for reproducing the time of day used by the sender of the AV data, using the 27-MHz clock signal obtained by the PLL section 12 and the PCR value extracted by the PCR extracting section 11.

The STB 33 is connected to an antenna 6. The IEEE1394 interface 5 is connected to the IEEE1394 bus 3, to which a CS tuner 7 and a DVHS 8 are also connected.

The operation of the present embodiment is described below.

Broadcast waves transmitted from broadcasting stations are converted to electric signals by the antenna 6. The BS tuner 4 then receives and demodulates the broadcast waves having been converted to the electric signals. Here, program data is sent using the transport packets of MPEG2 transport stream.

The demodulated data is transferred to the transport decoder 34.

The CS tuner 7 receives a CS broadcast through an antenna 6 and demodulates it. The CS tuner 7 then transfers the demodulated AV data through the IEEE1394 bus 3 to the IEEE1394 interface 5. The IEEE1394 interface 5 transfers the AV data to the transport decoder 34.

Further, the DVHS 8 transfers the data in replay to the transport decoder 34 via a path similar to that of the CS tuner 7.

The transport decoder 34 separates the MPEG2 transport stream. At that time, the transport decoder 34 performs the following process.

That is, the television screen 65 comprises four screens in total of the main screen 66 and the three subsidiary screens 67-69. The transport decoder 34 extracts PCR from the AV data of the channel to be displayed on the main screen 66 among them. In the present embodiment, the main screen 66 displays a program 1 of a BS broadcasting channel, and the subsidiary screen 67 displays a program 2 of a BS broadcasting channel other than the channel displayed on the main screen. The subsidiary screen 68 displays a program 3 of a CS broadcasting channel. Further, the subsidiary screen 69 displays a specific program 4 among those being replayed by the DVHS 8. As such, the time standard of the AV data of a channel displayed on the television screen 65 differs from those of the other channels.

However, the PCR extracting section 11 extracts only the PCR of the AV data of the channel displayed on the main screen 66.

The PLL section 12 then establishes PLL synchronization, using the extracted PCR of the main screen 66. That is, the PLL section synchronizes the oscillation frequency with that of the oscillator of 27-MHz frequency used by the sender of the AV data as a time standard.

The STC counter 13 reproduces the time of day used by the sender of the AV data, using the 27-MHz clock signal obtained by the PLL section 12 and the PCR value extracted by the PCR extracting section 11. That is, the STC counter 13 reproduces the time of the channel to be displayed on the main screen 66.

Using the STC counter 13 and establishing AV synchronization with only the channel to be displayed on the main screen 66, the AV decoder 35 expands the compressed data in MPEG format and converts it to analog signals. That is, in the timing that the PTS (presentation time stamp) described in the data to be displayed on the main screen 66 coincides with the time indicated by the STC counter 13, the part of the data is expanded and converted to analog signals.

Here, the AV decoder 35 does not establish AV synchronization with the AV data of the channels to be displayed on the subsidiary screens 67-69, and hence, expands the MPEG-compressed data in a free running mode and converts them to analog signals.

The AV decoder 35 outputs the analog signals obtained by the above-mentioned process as a video signal and an audio signal. Video images are displayed on the four screens: the main screen 66 and the three subsidiary screens 67-69. The voice of the channel displayed on the main screen 66 is output from the main speaker.

As described above, the AV decoder 35 establishes AV synchronization with only the AV data of the channel to be displayed on the main screen 66, but does not establish AV synchronization with the AV data of the channels to be displayed on the subsidiary screens 67-69. The reason for such a configuration is described below in detail.

A transport packet of MPEG2 transport stream is provided with the above-mentioned PCR in a interval less than or equal to 100 msec. 5 Flag in the adaptation field of the header of a transport packet describes whether PCR is provided or not.

Further, there are two types of transport packets: an audio packet and a video packet, each of which is transferred as an independent packet. The type of such a transport packet can be identified by referring to the PID described in the header of the transport packet.

The transport decoder 34 separates such transport packets, generating audio elementary streams and video elementary streams. An audio elementary stream is provided with an audio PTS and a video elementary stream is provided with a video PTS.

The AV decoder 35 expands and outputs the audio elementary streams sequentially in the timing that the audio PTS of a stream coincides with the counter value in the STC counter 13. Similarly, the AV decoder 35 expands and outputs the video elementary streams in the timing that the video PTS of a stream coincides with the counter value in the STC counter 13.

Accordingly, the voice and the video image coincide with each other in the timing of display. For example, in case of a movie, the movement of the lips of a character perfectly coincides with the voice output. Thus, such lip synchronization is established on the main screen which is AV-synchronized.

Lips-synchronization is not established in the channels displayed on the subsidiary screens 67-69 because the AV data of those channels are not AV-synchronized. However, the voices of the subsidiary screens 67-69 are not output from the main speaker. Typically, those voices of the subsidiary screens 67-69 are not output from anywhere. Therefore, the lip synchronization is unnecessary to establish for the subsidiary screens 67-69. Those facts explain the reason why the AV synchronization is performed only for the channel to be displayed on the main screen 66, but why the free-running AV decoding is performed for the channels to be displayed on the subsidiary screens 67-69.

Nevertheless, in an exceptional case that the voice of the channel to be displayed on any one of the subsidiary screens 67-69 is output from an earphone jack in the television set, the video image and the voice do not coincide with each other in the timing.

In addition, the video images displayed on the subsidiary screens 67-69 have a difficulty, such as color flicker, because of the absence of AV synchronization. However, the display areas of the subsidiary screens 67-69 are smaller than the main screen 66, and hence, the above-mentioned color flicker below a certain level is substantially not recognizable.

Further, during the period from when the channel to be displayed on the main screen 66 was changed to another channel to when new STC comes to be correctly generated by the PCR extraction and the PLL synchronization of the new channel, AV synchronization is not established. To shadow such synchronization error and block noise, it is necessary to blackout the video image and mute the voice.

As such, the STB 33 of the present embodiment realizes an STB of a small apparatus scale, though there are the disadvantages of a difficulty in the subsidiary-screen display and of being unable to immediately display the AV data of a newly selected channel after the main-screen channel is changed to another.

Third Embodiment

The third embodiment is described below with reference to FIGS. 3 and 12.

Figure 3:
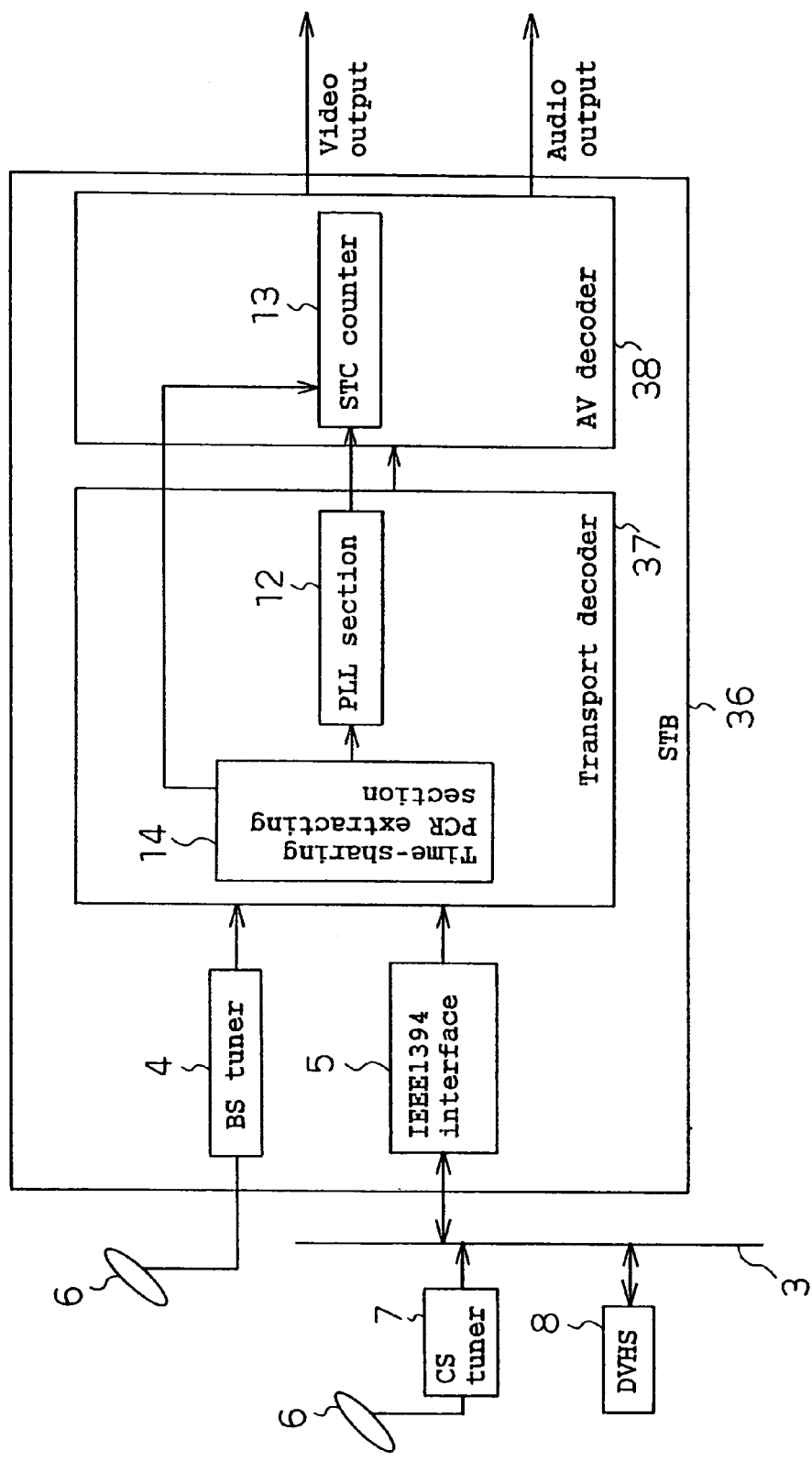
FIG. 3 is a block diagram showing the configuration of an STB according to the third embodiment of the present invention.

FIG. 3 is a block diagram illustrating the configuration of an STB for generating data for performing multichannel display of the present embodiment.

FIG. 12 illustrates an example of a television screen displaying the multichannel display data generated by the STB 36 shown in FIG. 3.

In FIG. 12, a television screen 65 comprises four screens and is identical to those of the first and the second embodiments.

As shown in FIG. 3, the STB 36 comprises a BS tuner 4, an IEEE1394 interface 5, a transport decoder 37, and an AV decoder 38.

The difference from the second embodiment is that a time-sharing PCR extracting section 14 is provided instead of a PCR extracting section 11. The other points of the configuration are identical to those of the second embodiment, and hence, not described herein.

The time-sharing PCR extracting section 14 is means for extracting PCR in a time-sharing mode from the AV data of each channel to be displayed on each screen of the television screen 65.

The operation of the present embodiment is described below with emphasis on the difference from the second embodiment.

The operation in the path before an MPEG2 transport stream reaches at the transport decoder 37 is identical to that of the second embodiment.

The transport decoder 37 separates the MPEG2 transport stream. At that time, the transport decoder 34 performs the following process.

That is, the television screen 65 comprises four screens in total of the main screen 66 and the three subsidiary screens 67-69. The transport decoder 37 extracts PCR from the AV data of the channel to be displayed on the main screen 66 among them.

In the present embodiment, the main screen 66 displays a program 1 of a BS broadcasting channel, and the subsidiary screen 67 displays a program 2 of a BS broadcasting channel other than the channel displayed on the main screen. The subsidiary screen 68 displays a program 3 of a CS broadcasting channel. Further, the subsidiary screen 69 displays a specific program 4 among those being replayed by the DVHS 8. As such, the time standard of the AV data of a channel displayed on the television screen 65 differs from those of the other channels.

The time-sharing PCR extracting section 14 normally extracts the PCR of the AV data of the channel displayed on the main screen 66. Only when the channel displayed on one of the subsidiary screens 67-69 is changed, the PCR of the AV data of the new channel is extracted for a predetermined time. After the predetermined time, the PCR of the AV data of the channel displayed on the main screen 66 is again extracted.

For example, the channel displayed on the subsidiary screen 67 is changed to another selected channel, the time-sharing PCR extracting section 14 extracts the PCR of the selected channel for a predetermined time.

The PLL section 12 then establishes PLL synchronization, using the extracted PCR for the main screen 66. That is, the PLL section synchronizes the oscillation frequency with that of the oscillator of 27-MHz frequency used by the sender of the AV data as a time standard. When the time-sharing PCR extracting section 14 is extracting the PCR of the AV data of the channel displayed on the main screen 66, the PLL section 12 establishes PLL synchronization with the channel displayed on the main screen 66. When the time-sharing PCR extracting section 14 is extracting the PCR of the AV data of a channel displayed on any one of the subsidiary screens 67-69, the PLL section 12 establishes PLL synchronization with that channel.

The STC counter 13 reproduces the time of day used by the sender of the AV data, using the 27-MHz clock signal obtained by the PLL section 12 and the PCR value extracted by the time-sharing PCR extracting section 14.

That is, when the time-sharing PCR extracting section 14 is extracting the PCR of the AV data of the channel displayed on the main screen 66, the PLL section 12 is also establishing PLL synchronization with the channel displayed on the main screen 66. Accordingly, the STC counter 13 reproduces the time of the channel displayed on the main screen 66. When the time-sharing PCR extracting section 14 is extracting the PCR of the AV data of a channel displayed on any one of the subsidiary screens 67-69, the PLL section 12 is also establishing PLL synchronization with the channel displayed on the any one of the subsidiary screens 67-69. Accordingly, the STC counter 13 reproduces the time of that channel.

Using the STC counter 13, the AV decoder 38 expands the compressed data in MPEG format and converts it to analog signals. Here, when the STC counter 13 is reproducing the time of the channel displayed on the main screen 66, the AV decoder 38 expands the AV data in AV synchronization with the AV data of that channel but out of AV synchronization with the AV data of the other channels and converts it to analog signals. When the STC counter 13 is reproducing the time of the channel displayed on one of the subsidiary screens 67-69, the AV decoder 38 expands the AV data in AV synchronization with the AV data of the channel the time of which is being reproduced but out of AV synchronization with the AV data of the other channels and converts it to analog signals.

That is, when processing the AV data of the channel displayed on the main screen 66 in AV synchronization, the AV decoder 38 processes the AV data of the other channels in a free-running mode. When processing the AV data of the channel displayed on any one of the subsidiary screens 67-69 in AV synchronization, the AV decoder processes the AV data of the other channels, including the channel displayed on the main screen 66, in a free-running mode.

The AV decoder 38 outputs the analog signals obtained by the above-mentioned process as a video signal and an audio signal. Video images are displayed on the four screens: the main screen 66 and the three subsidiary screens 67-69. The voice of the channel displayed on the main screen 66 is output from the main speaker.

As such, in the present embodiment, the AV data of the channel displayed on the main screen is normally processed in AV synchronization. Only when the channel displayed on a subsidiary screen is changed, the AV data of the new channel is processed in AV synchronization for a predetermined time. After the predetermined time, the PCR of the AV data of the channel displayed on the main screen is again processed in AV synchronization.

Accordingly, the present embodiment can improve a difficulty in display, such as color flicker in the subsidiary screens, keeping an apparatus scale similar to that of the second embodiment.

Although, in the description of the present embodiment, the PLL section 12 establishes PLL synchronization with the channel the PCR of which is extracted by the time-sharing PCR extracting section 14, this description is not restrictive. The PLL section 12 may always establish PLL synchronization with the channel displayed on the main screen. That is, the clock of the channel displayed on the main screen may be always reproduced.

Fourth Embodiment

The fourth embodiment is described below with reference to FIGS. 4, 11, and 12.

Figure 4:
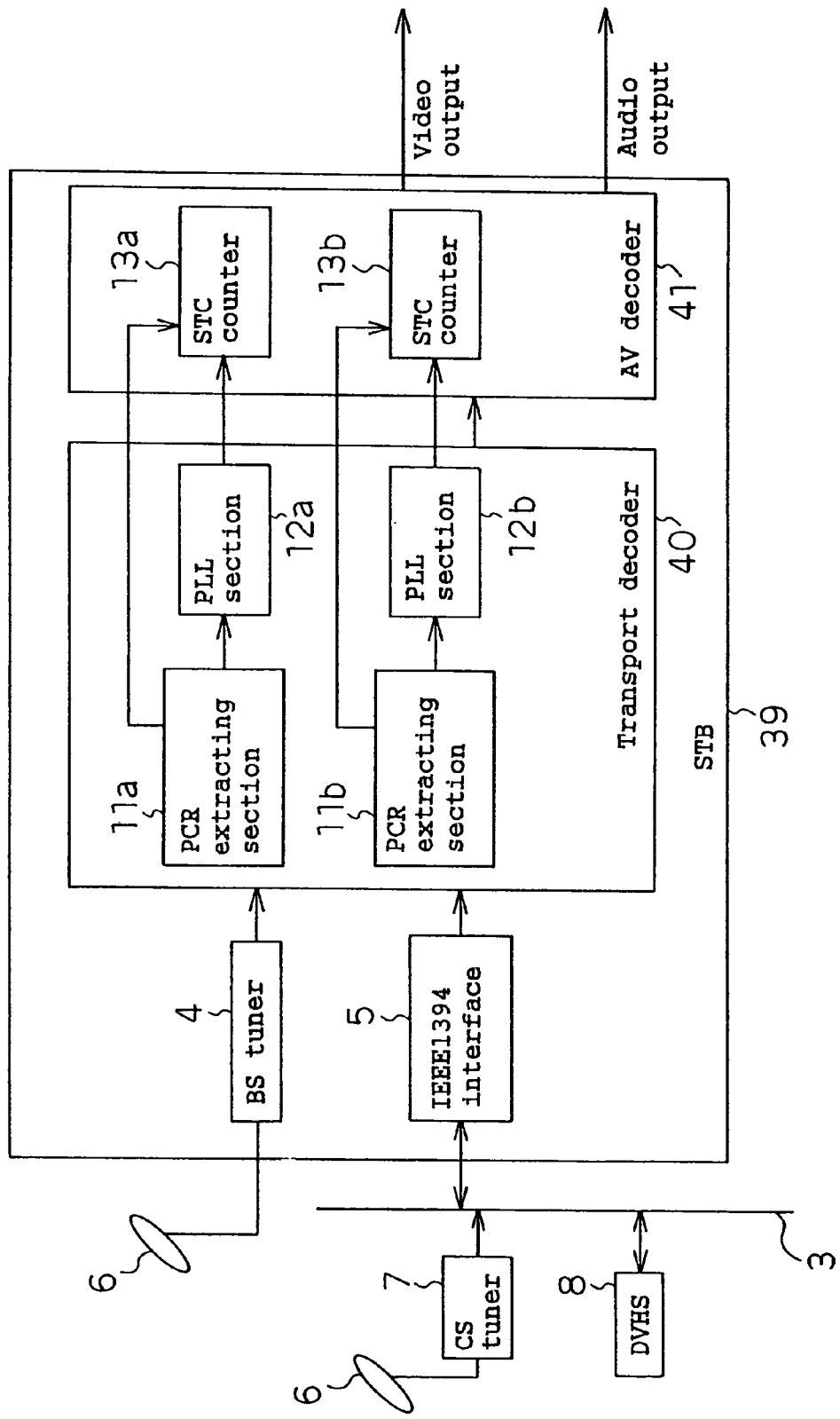
FIG. 4 is a block diagram showing the configuration of an STB according to the fourth embodiment of the present invention.

FIG. 4 is a block diagram illustrating the configuration of an STB for generating data for performing multichannel display of the present embodiment.

FIG. 12 illustrates an example of a television screen displaying the multichannel display data generated by the STB 39 shown in FIG. 4. The example is identical to those described previously in the first and the second embodiments.

Figure 11:
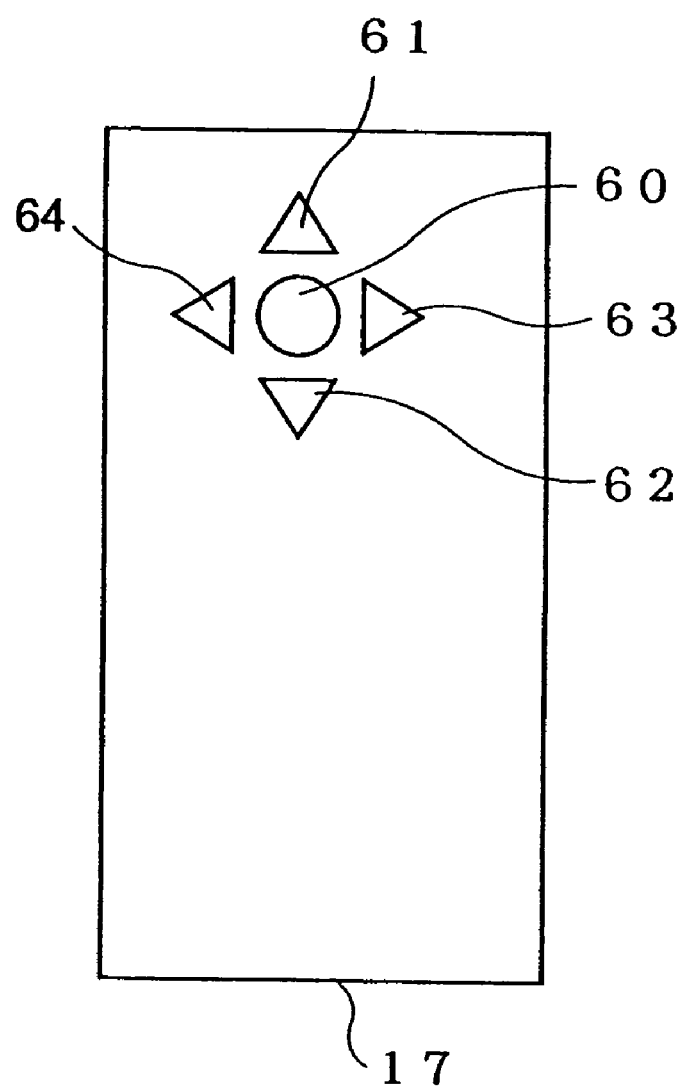
FIG. 11 illustrates an example of a remote controller of the first to the tenth embodiments of the present invention.

FIG. 11 shows a remote controller 17 for controlling the television screen 65 of FIG. 12. The remote controller 17 comprises the operation buttons of "Confirm" 60, "Up" 61, "Down" 62, "Right" 63, and "Left" 64. The remote controller further comprises additional operation buttons, such as an on/off button of the television-set power and a channel selection button, but they are omitted for the simplicity of explanation.

The screen fringe of the subsidiary screen 68 differs from those of the other screens. This is because a cursor is located on the subsidiary screen 68. The cursor located now on the subsidiary screen 68 can be moved by pushing the respective buttons of "Up" 61, "Down" 62, "Right" 63, and "Left" 64 provided in the remote controller 17. For example, the cursor moves form the subsidiary screen 68 to the main screen 66 when the "Left" button 64 is pushed. The cursor moves form the subsidiary screen 68 to the subsidiary screen 67 when the "Up" button 61 is pushed. If the "Confirm" button 60 is pushed, the channel displayed on the screen where the cursor is located is displayed on the main screen 66. In this sense, the subsidiary screen where the cursor is located is called the candidate subsidiary screen for the next main screen 66.

Returning to FIG. 4, the present embodiment differs from the second embodiment in the point that the STB 39 comprises two sets of PCR extracting sections 11a, 11b, PLL sections 12a, 12b, and STC counters 13a, 13b.

The PCR extracting section 11a is means for extracting PCR from the AV data of a channel displayed on the main screen 66 of the television screen 65 or on the candidate subsidiary screen for the next main screen 66. The PCR extracting section 11b is means for extracting PCR from the AV data of the channel which is a channel displayed on the main screen 66 of the television screen 65 or on the candidate subsidiary screen for the next main screen 66 but is the other channel than the channel the PCR of which is extracted by the PCR extracting section 11a.

The PLL section 12a is means for establishing PLL synchronization with a channel displayed on the main screen 66 or on the candidate subsidiary screen for the next main screen 66, using the PCR extracted by the PCR extracting section 11a. The PLL section 12b is means for establishing PLL synchronization with a channel displayed on the main screen 66 or on the candidate subsidiary screen for the next main screen 66, using the PCR extracted by the PCR extracting section 11b. In other words, the PLL sections 12a, 12b are means for synchronizing the oscillation frequencies with those of the oscillators of 27-MHz frequency used by the senders of the AV data as a time standard.

The STC counter 13a is means for reproducing the time of a channel displayed on the main screen 66 or on the candidate subsidiary screen for the next main screen 66, using the 27-MHz clock signal obtained by the PLL section 12a and the PCR value extracted by the PCR extracting section 11a. The STC counter 13b is means for reproducing the time of a channel displayed on the main screen 66 or on the candidate subsidiary screen for the next main screen 66, using the 27-MHz clock signal obtained by the PLL section 12b and the PCR value extracted by the PCR extracting section 11b.

The operation of the present embodiment is described below with emphasis on the difference from the second embodiment.

In the second embodiment, always, the PCR of the AV data of the channel displayed on the main screen was extracted and the channel displayed on the main screen was PLL-synchronized. And, always, the time of the channel displayed on the main screen was reproduced and only the AV data of the channel displayed on the main screen was expanded in AV synchronization.

In the present embodiment, any one of the PCR extracting sections 11a, 11b always extracts the PCR of the AV data of the channel displayed on the main screen 66. The other extracts the PCR of the channel displayed on the candidate subsidiary screen for the next main screen 66.

When the PCR extracting section 11a extracts the PCR of the AV data of the channel displayed on the main screen 66, the PLL section 12a establishes PLL synchronization with the channel displayed on the main screen 66. When the PCR extracting section 11a extracts the PCR of the candidate subsidiary screen for the next main screen 66, the PLL section 12a establishes PLL synchronization with the channel displayed on the candidate subsidiary screen for the next main screen 66. The PLL section 12b operates similarly. That is, any one of the PLL sections 12a, 12b establishes PLL synchronization with the channel displayed on the main screen 66, and the other establishes PLL synchronization with the channel displayed on the candidate subsidiary screen for the next main screen 66.

Further, any one of the STC counters 13a, 13b reproduces the time of the channel displayed on the main screen 66, and the other reproduces the channel displayed on the candidate subsidiary screen for the next main screen 66.

The AV decoder 41 expands the AV data of the channel displayed on the main screen 66 and the AV data of the channel displayed on the candidate subsidiary screen for the next main screen 66 in AV synchronization and converts them to analog signals, but expands the other AV data out of AV synchronization and converts it to analog signals.

On the television screen 65 of FIG. 12, the candidate subsidiary screen for the next main screen 66 is the subsidiary screen 68. Thus, the AV decoder 41 expands the AV data of the channel displayed on the main screen 66 and the AV data of the channel displayed on the subsidiary screen 68 in AV synchronization and converts them to analog signals, but expands the other AV data out of AV synchronization or in a free-running mode and converts it to analog signals.

Assume that the "Up" button 61 is pushed at this stage. Then, the cursor moves to the subsidiary screen 67. That is, the candidate subsidiary screen for the next main screen 66 has been changed. Thus, any one of the PCR extracting sections 11a, 11b, any one of the PLL sections 12a, 12b, and any one of the STC counters 13a, 13b stop the processing of the channel displayed on the subsidiary screen 68, starting the processing of the channel displayed on the subsidiary screen 67.

If the "Confirm" button 60 of the remote controller 17 is pushed when the status of the television screen 65 is as described above, that is, when the subsidiary screen 67 is the candidate subsidiary screen for the next main screen 66, the channel having been displayed on the subsidiary screen 67 comes to be displayed on the main screen 66, and the channel having been displayed on the main screen 66 comes to be displayed on the subsidiary screen 67. That is, the channel of the main screen 66 and the channel of the candidate subsidiary screen for the next main screen 66 are changed with each other.

However, even when the channels have been changed with each other, the STC counters 13a, 13b still reproduce the times of the both channels displayed on the main screen 66 and the candidate subsidiary screen for the next main screen 66. Therefore, the AV decoder 41 can continue the processing without any break of the AV synchronization with the AV data of the channel displayed on the main screen 66 and the AV data of the channel displayed on the candidate subsidiary screen for the next main screen 66.

The present embodiment permits immediate channel changing of the main screen 66, though the scale of the apparatus becomes somewhat larger than that of the second embodiment.

Fifth Embodiment

The fifth embodiment is described with reference to FIGS. 5 and 12.

Figure 5:
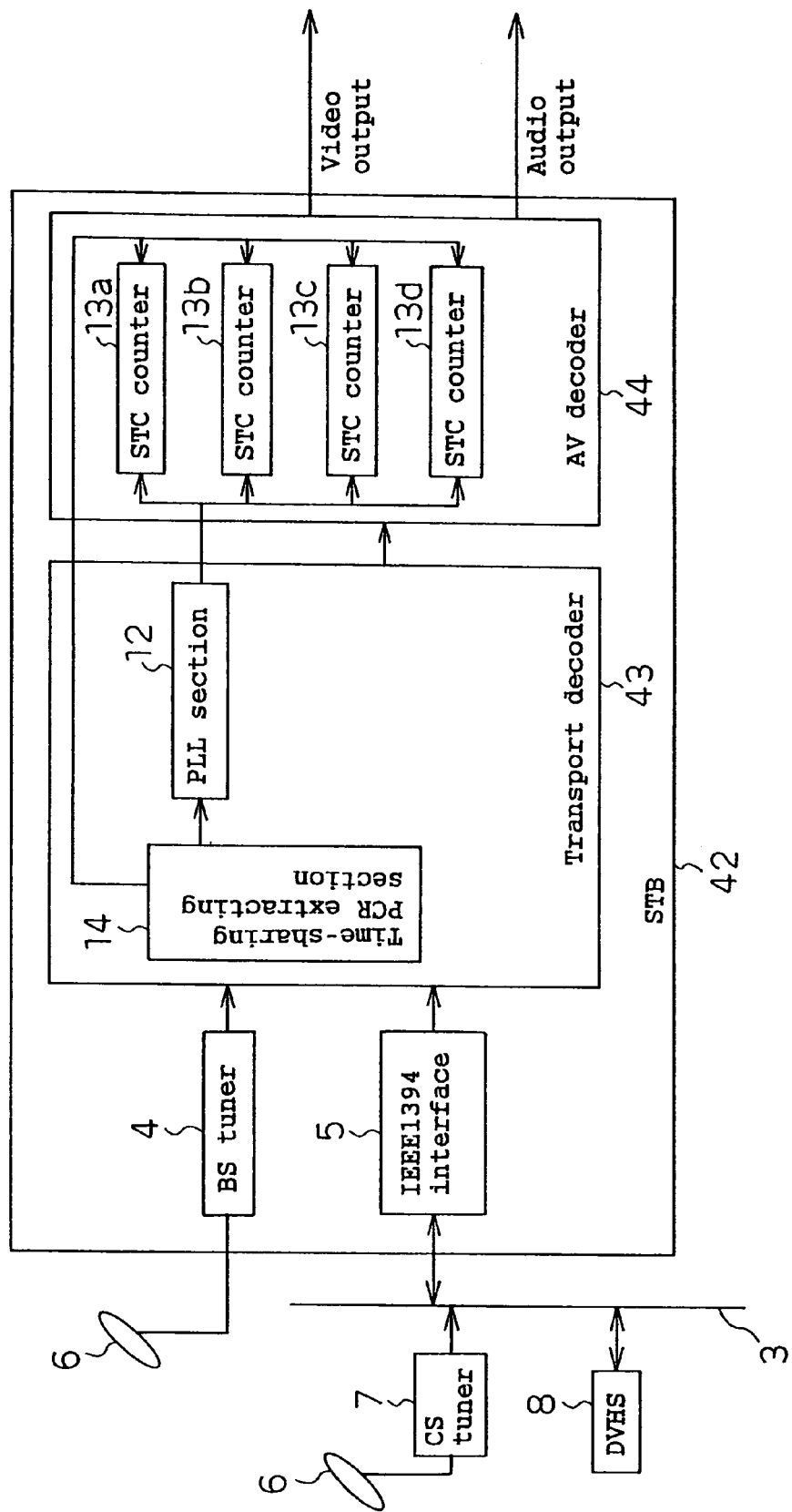
FIG. 5 is a block diagram showing the configuration of an STB according to the fifth embodiment of the present invention.

FIG. 5 is a block diagram illustrating the configuration of an STB for generating data for performing multichannel display of the present embodiment.

FIG. 12 illustrates an example of a television screen displaying the multichannel display data generated by the STB 42 shown in FIG. 5.

In FIG. 12, a television screen 65 comprises four screens and is identical to those of the first embodiment and the second embodiment.

As shown in FIG. 5, the STB 42 comprises a BS tuner 4, an IEEE1394 interface 5, a transport decoder 43, and an AV decoder 44.

The difference from the first embodiment is that only one PLL section 12 is provided in the present embodiment instead of the four PLL sections 12a-d in the first embodiment.

The other points of the configuration are identical to those of the first embodiment, and hence, the description is omitted.

The PLL section 12 is means for establishing PLL synchronization with the channel displayed on the main screen 66.

The operation of the present embodiment is described below with emphasis on the difference from the first embodiment.

Similarly to the first embodiment, the time-sharing PCR extracting section 14 extracts the PCR of the channels displayed on the main screen 66 and the subsidiary screens 67-69 in a time-sharing mode. The PLL section 12 then establishes PLL synchronization with the channel displayed on the main screen 66, using the extracted PCR of the channel displayed on the main screen 66.

The STC counters 13a-d reproduce the times of the channels displayed on the main screen 66 and the subsidiary screens 67-69, using the extracted PCR by the time-sharing PCR extracting section 14 and the clock signal generated by the PLL section 12.

That is, the times of the channels displayed on the subsidiary screens 67-69 are reproduced using the clock signal of the channel displayed on the main screen 66.

Referring to the counter values in the STC counters 13a-d, the AV decoder 44 expands the AV data of the all channels displayed on the main screen 66 and the subsidiary screens 67-69 in AV synchronization and converts them to analog signals.

As such, the scale of the apparatus can be reduced in comparison with that of the first embodiment.

Sixth Embodiment

The sixth embodiment is described below with reference to FIGS. 6, 11, and 12.

Figure 6:
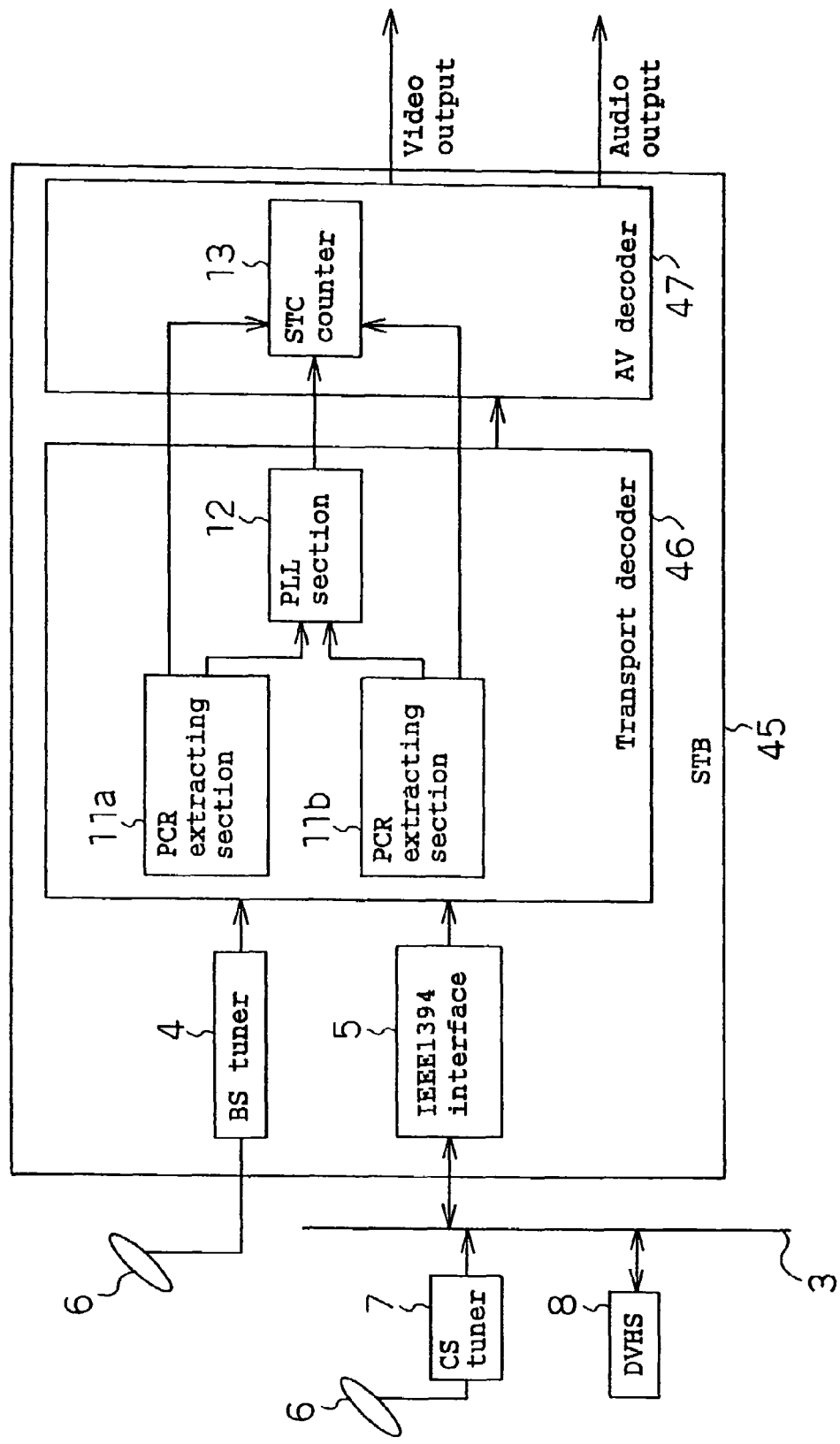
FIG. 6 is a block diagram showing the configuration of an STB according to the sixth embodiment of the present invention.

FIG. 6 is a block diagram illustrating the configuration of an STB for generating data for performing multichannel display of the present embodiment.

FIG. 12 illustrates an example of a television screen displaying the multichannel display data generated by the STB 45 shown in FIG. 6. The example is identical to those described previously in the first and the second embodiments.

FIG. 11 shows a remote controller 17 for controlling the television screen 65 of FIG. 12. The remote controller is identical to that described previously in the fourth embodiment.

In FIG. 6, the difference from the second embodiment is that the STB 45 comprises two PCR extracting sections 11a, 11b.

The PCR extracting section 11a is means for extracting PCR from the AV data of a channel displayed on the main screen 66 of the television screen 65 or on the candidate subsidiary screen for the next main screen 66. The PCR extracting section 11b is means for extracting PCR from the AV data of the channel which is a channel displayed on the main screen 66 of the television screen 65 or on the candidate subsidiary screen for the next main screen 66 but is the other channel than the channel the PCR of which is extracted by the PCR extracting section 11a.

The PLL section 12 is means for establishing PLL synchronization with the channel displayed on the main screen 66. In other words, the PLL section 12 is means for synchronizing the oscillation frequency with that of the oscillator of 27-MHz frequency used by the sender of the AV data as a time standard.

The STC counter 13 is means for reproducing the time of the channel displayed on the main screen 66, using the 27-MHz clock signal obtained by the PLL section 12 and the PCR value of the channel displayed on the main screen 66 extracted by any one of the PCR extracting sections 11a, 11b.

The operation of the present embodiment is described below with emphasis on the difference from the second embodiment.

In the second embodiment, always, the PCR of the AV data of the channel displayed on the main screen was extracted and the channel displayed on the main screen was PLL-synchronized. And, always, the time of the channel displayed on the main screen was reproduced and only the AV data of the channel displayed on the main screen was expanded in AV synchronization.

In the present embodiment, any one of the PCR extracting sections 11a, 11b always extracts the PCR of the AV data of the channel displayed on the main screen 66. The other extracts the PCR of the channel displayed on the candidate subsidiary screen for the next main screen 66.

The PLL section 12 always establishes PLL synchronization with the channel displayed on the main screen 66. Further, the STC counter 13 reproduces the time of the channel displayed on the main screen 66.

The AV decoder 47 expands the AV data of the channel displayed on the main screen 66 in AV synchronization and converts it to analog signals, but expands the other AV data out of AV synchronization and converts it to analog signals.

On the television screen 65 of FIG. 12, the candidate subsidiary screen for the next main screen 66 is the subsidiary screen 68. Thus, the AV decoder 47 expands the AV data of the channel displayed on the main screen 66 in AV synchronization and converts it to analog signals, but expands the other AV data out of AV synchronization or in a free-running mode and converts it to analog signals.

Assume that the "Up" button 61 is pushed at this stage. Then, the cursor moves to the subsidiary screen 67. That is, the candidate subsidiary screen for the next main screen 66 has been changed. Thus, any one of the PCR extracting sections 11a, 11b stops the extraction from the channel displayed on the subsidiary screen 68, starting the extraction of the PCR of the channel displayed on the subsidiary screen 67.

If the "Confirm" button 60 of the remote controller 17 is pushed when the status of the television screen 65 is as described above, that is, when the subsidiary screen 67 is the candidate subsidiary screen for the next main screen 66, the channel having been displayed on the subsidiary screen 67 comes to be displayed on the main screen 66, and the channel having been displayed on the main screen 66 comes to be displayed on the subsidiary screen 67. That is, the channel of the main screen 66 and the channel of the candidate subsidiary screen for the next main screen 66 are changed with each other.

When the channels displayed on the main screen 66 and the subsidiary screen 67 have been changed with each other as described above, the PLL section 12 starts to establish PLL synchronization with the channel newly displayed on the main screen 66, using the PCR, which has been being extracted by any one of the PCR extracting sections 11a, 11b, of the AV data of the channel newly displayed on the main screen 66.

The STC counter 13 then reproduces the time of the channel newly displayed on the main screen 66.

The AV decoder 47 stops to establish AV synchronization with the AV data of the channel previously displayed on the main screen 66, starting to establish AV synchronization with the AV data of the channel newly displayed on the main screen 66.

In the present embodiment, the PCR extracting sections 11a, 11b extract both the PCR of the AV data of the channel displayed on the main screen 66 and the PCR of the AV data of the channel displayed on the candidate subsidiary screen for the next main screen 66. Accordingly, even when the channel of the main screen 66 and the channel of the candidate subsidiary screen for the next main screen 66 have been changed with each other, PLL synchronization can be established using the PCR, which has been being extracted, of the AV data of the channel newly displayed on the main screen 66. Thus, the time waiting for the arrival of the next PCR of the channel newly displayed on the main screen 66 before the PLL synchronization is established is reduced in comparison with the second embodiment. Therefore, fast channel changing of the main screen 66 is realizable, though the scale of the apparatus becomes somewhat larger than that of the second embodiment.

Seventh Embodiment

The seventh embodiment is described below with reference to FIGS. 7, 11, and 12.

Figure 7:
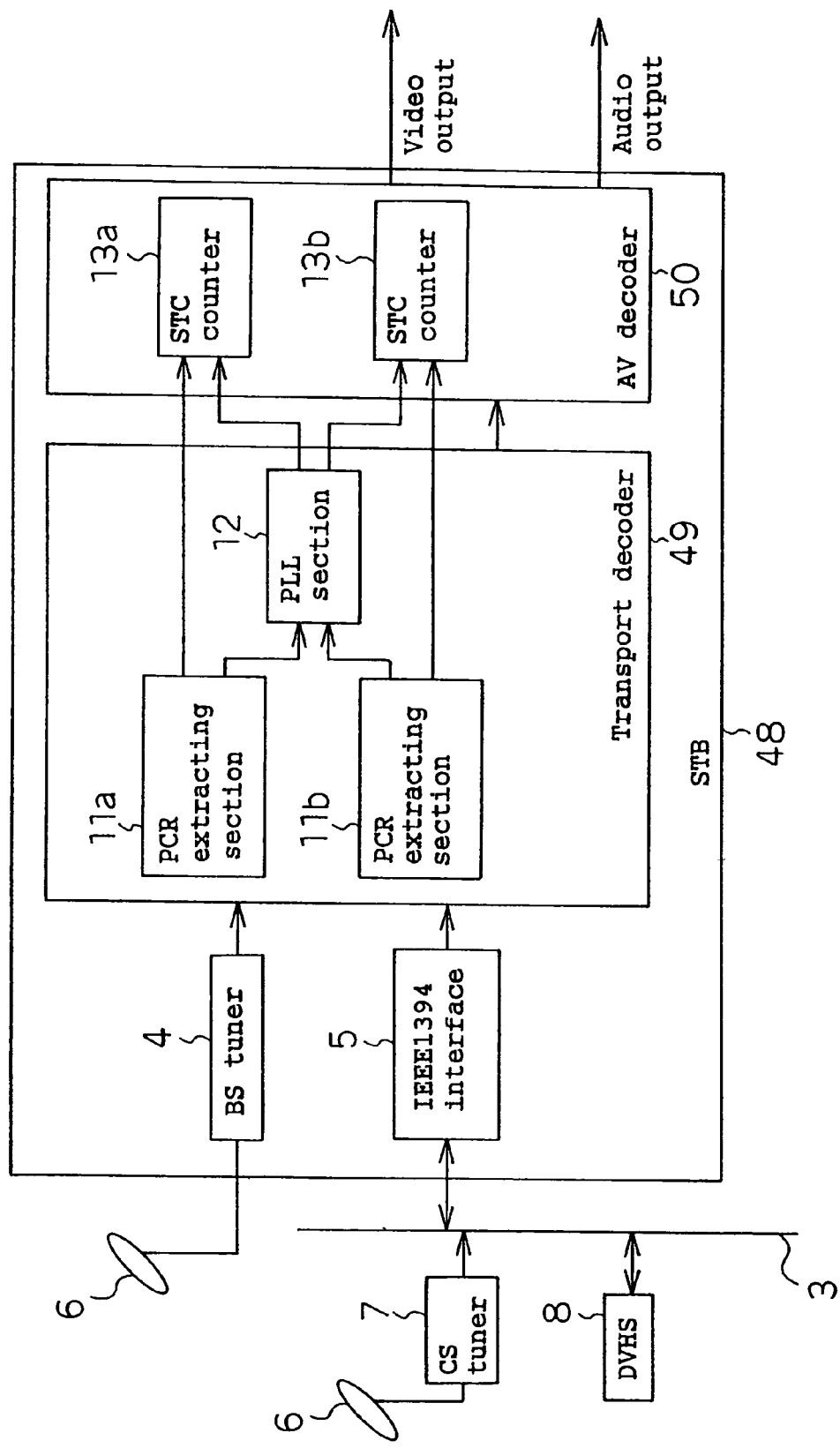
FIG. 7 is a block diagram showing the configuration of an STB according to the seventh embodiment of the present invention.

FIG. 7 is a block diagram illustrating the configuration of an STB for generating data for performing multichannel display of the present embodiment.

FIG. 12 illustrates an example of a television screen displaying the multichannel display data generated by the STB 48 shown in FIG. 7. The example is identical to those described previously in the first and the second embodiments.

FIG. 11 shows a remote controller 17 for controlling the television screen 65 of FIG. 12. The remote controller is identical to that described previously in the fourth embodiment.

In FIG. 7, the difference from the second embodiment is that the STB 48 comprises two PCR extracting sections 11a, 11b and two STC counters 13a, 13b.

The PCR extracting section 11a is means for extracting PCR from the AV data of a channel displayed on the main screen 66 of the television screen 65 or on the candidate subsidiary screen for the next main screen 66. The PCR extracting section 11b is means for extracting PCR from the AV data of the channel which is a channel displayed on the main screen 66 of the television screen 65 or on the candidate subsidiary screen for the next main screen 66 but is the other channel than the channel the PCR of which is extracted by the PCR extracting section 11a.

The PLL section 12 is means for establishing PLL synchronization with the channel displayed on the main screen 66. In other words, the PLL section 12 is means for synchronizing the oscillation frequency with that of the oscillator of 27-MHz frequency used by the sender of the AV data as a time standard.

The STC counters 13a, 13b are means for reproducing the time of the main screen 66 and the time of the candidate subsidiary screen for the next main screen 66, using the 27-MHz clock signal obtained by the PLL section 12 and the PCR values of the channels displayed on the main screen 66 and the candidate subsidiary screen for the next main screen 66 extracted by the PCR extracting sections 11a, 11b.

The operation of the present embodiment is described below with emphasis on the difference from the second embodiment.

In the second embodiment, always, the PCR of the AV data of the channel displayed on the main screen was extracted and the channel displayed on the main screen was PLL-synchronized. And, always, the time of the channel displayed on the main screen was reproduced and only the AV data of the channel displayed on the main screen was expanded in AV synchronization.

In the present embodiment, any one of the PCR extracting sections 11a, 11b always extracts the PCR of the AV data of the channel displayed on the main screen 66. The other extracts the PCR of the channel displayed on the candidate subsidiary screen for the next main screen 66.

The PLL section 12 always establishes PLL synchronization with the channel displayed on the main screen 66.

The STC counters 13a, 13b reproduce the time of the channel displayed on the main screen 66, as well as the time of the channel displayed on the candidate subsidiary screen for the next main screen 66, using the clock signal from the PLL section 12.

The AV decoder 50 expands the AV data of the channel displayed on the main screen 66 in AV synchronization and converts it to analog signals, and also expands the AV data of the channel displayed on the candidate subsidiary screen for the next main screen 66 in AV synchronization and converts it to analog signals, but expands the other AV data out of AV synchronization and converts it to analog signals.

On the television screen 65 of FIG. 12, the candidate subsidiary screen for the next main screen 66 is the subsidiary screen 68. Thus, the AV decoder 50 expands the AV data of the channel displayed on the main screen 66 in AV synchronization and converts it to analog signals, but expands the other AV data out of AV synchronization or in a free-running mode and converts it to analog signals.

Assume that the "Up" button 61 is pushed at this stage. Then, the cursor moves to the subsidiary screen 67. That is, the candidate subsidiary screen for the next main screen 66 has been changed. Thus, any one of the PCR extracting sections 11a, 11b stops the extraction from the channel displayed on the subsidiary screen 68, starting the extraction of the PCR of the channel displayed on the subsidiary screen 67.

If the "Confirm" button 60 of the remote controller 17 is pushed when the status of the television screen 65 is as described above, that is, when the subsidiary screen 67 is the candidate subsidiary screen for the next main screen 66, the channel having been displayed on the subsidiary screen 67 comes to be displayed on the main screen 66, and the channel having been displayed on the main screen 66 comes to be displayed on the subsidiary screen 67. That is, the channel of the main screen 66 and the channel of the candidate subsidiary screen for the next main screen 66 are changed with each other.

When the channels displayed on the main screen 66 and the subsidiary screen 67 have been changed with each other as described above, the PLL section 12 starts to establish PLL synchronization with the channel newly displayed on the main screen 66, using the PCR, which has been being extracted by any one of the PCR extracting sections 11a, 11b, of the AV data of the channel newly displayed on the main screen 66.

The STC counters 13a, 13b then reproduce the time of the channel displayed on the main screen 66 and the time of the channel displayed on the candidate subsidiary screen for the next main screen 66. Here, the channel newly displayed on the main screen 66 is newly PLL-synchronized by the PLL section 12. Therefore, any one of the STC counters 13a, 13b reproduces the time of the newly displayed on the main screen 66, using the clock signal in PLL synchronization with the channel.

The AV decoder 50 establishes AV synchronization with the AV data of the channel previously displayed on the main screen 66 as well as the AV data of the channel newly displayed on the main screen 66.

In the present embodiment, the STC counters 13a, 13b reproduce both the time of the channel displayed on the main screen 66 and the time of the channel displayed on the candidate subsidiary screen for the next main screen 66. Accordingly, even when the channel of the main screen 66 and the channel of the candidate subsidiary screen for the next main screen 66 have been changed with each other, AV synchronization can be continuously established using the time which has been being reproduced. Therefore, fast channel changing of the main screen 66 is realizable, though the scale of the apparatus becomes somewhat larger than that of the second embodiment.

Eighth Embodiment

The eighth embodiment is described below with reference to FIGS. 8 and 12.

Figure 8:
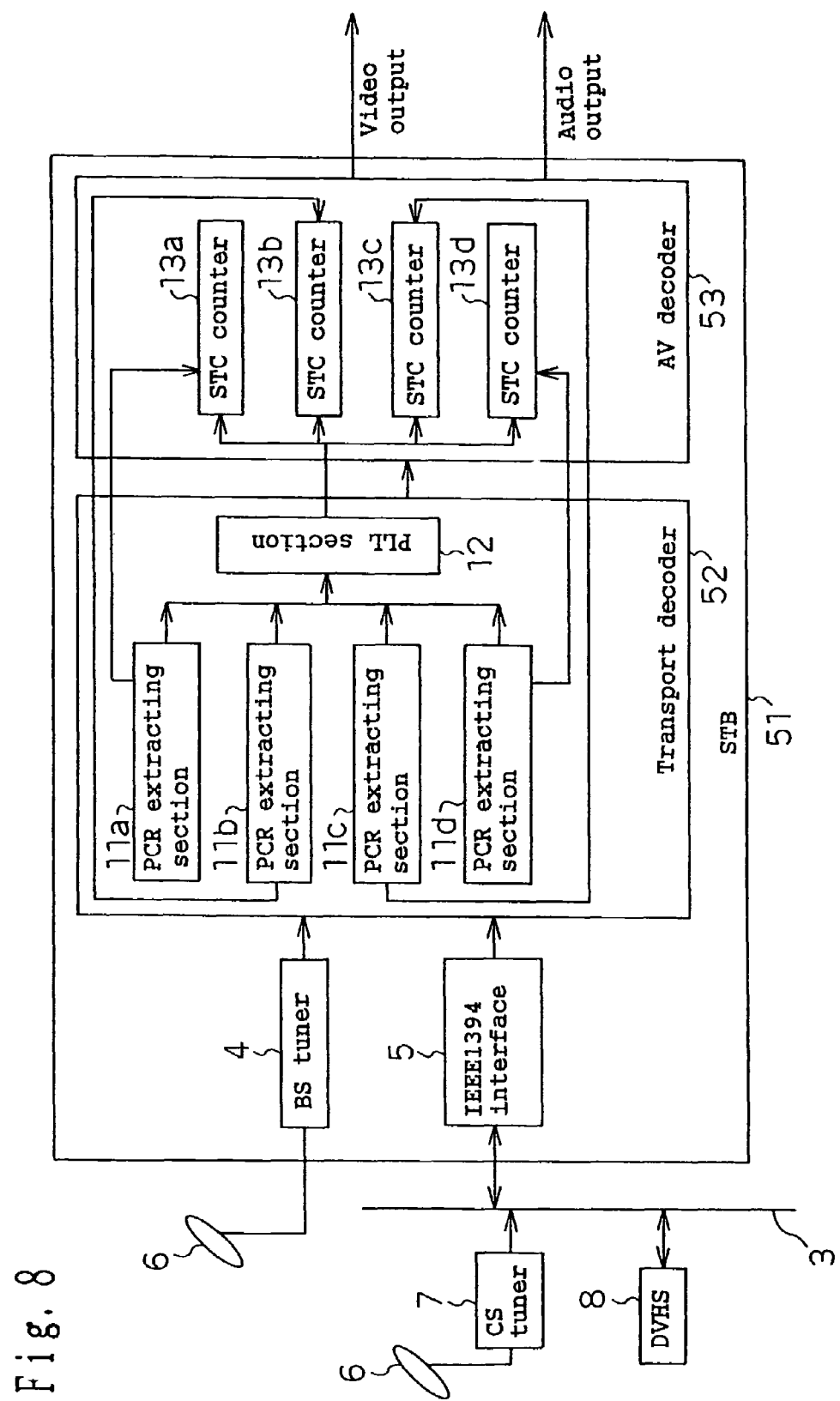
FIG. 8 is a block diagram showing the configuration of an STB according to the eighth embodiment of the present invention.

FIG. 8 is a block diagram illustrating the configuration of an STB for generating data for performing multichannel display of the present embodiment.

FIG. 12 illustrates an example of a television screen displaying the multichannel display data generated by the STB 51 shown in FIG. 8. The example is identical to those described previously in the first and the second embodiments.

In FIG. 8, the difference from the second embodiment is that the STB 51 comprises four PCR extracting sections 11a-d and four STC counters 13a-d. That is, the STB 51 comprises the same number of PCR extracting sections 11a-d and the same number of STC counters 13a-d as the number of the screens provided on the television screen 65.

The PCR extracting sections 11a-d are means for extracting PCR from the AV data of all channels displayed on the main screen 66 and the subsidiary screens 67-69 of the television screen 65.

The PLL section 12 is means for establishing PLL synchronization with the channel displayed on the main screen 66. In other words, the PLL section 12 is means for synchronizing the oscillation frequency with that of the oscillator of 27-MHz frequency used by the sender of the AV data as a time standard.

The STC counters 13a-d are means for reproducing the times of the all channels displayed on the main screen 66 and the subsidiary screens 67-69, using the 27-MHz clock signal obtained by the PLL section 12 and the PCR values of the channels displayed on the main screen 66 and the subsidiary screens 67-69 extracted by the PCR extracting sections 11a-d.

The operation of the present embodiment is described below with emphasis on the difference from the second embodiment.

In the second embodiment, always, the PCR of the AV data of the channel displayed on the main screen was extracted and the channel displayed on the main screen was PLL-synchronized. And, always, the time of the channel displayed on the main screen was reproduced and only the AV data of the channel displayed on the main screen was expanded in AV synchronization.

In the present embodiment, the PCR extracting sections 11a-d always extract the PCR of the all channels of the main screen 66 and the subsidiary screens 67-69. That is, the PCR extracting section 11a extracts the PCR of the AV data of the channel displayed on the main screen 66. The PCR extracting section 11b extracts the PCR of the AV data of the channel displayed on the subsidiary screen 67. The PCR extracting section 11c extracts the PCR of the AV data of the channel displayed on the subsidiary screen 68. The PCR extracting section 11d extracts the PCR of the AV data of the channel displayed on the subsidiary screen 69.

The PLL section 12 always establishes PLL synchronization with the channel displayed on the main screen 66.

The STC counters 13a-d reproduce the times of the all channels displayed on the main screen 66 and the subsidiary screens 67-69.

The AV decoder 3 expands the AV data of the all channels displayed on the main screen 66 and the subsidiary screens 67-69 in AV synchronization and converts them to analog signals.

In the present embodiment, the AV decoder 3 can always expand the AV data of the all channels displayed on the main screen 66 and the subsidiary screens 67-69 in AV synchronization and convert them to analog signals. Therefore, immediate channel changing between the main screen 66 and any one of the subsidiary screens 67-69 is realizable, though the scale of the apparatus becomes somewhat larger than that of the second embodiment.

Ninth Embodiment

The ninth embodiment is described below with reference to FIGS. 9 and 12.

Figure 9:
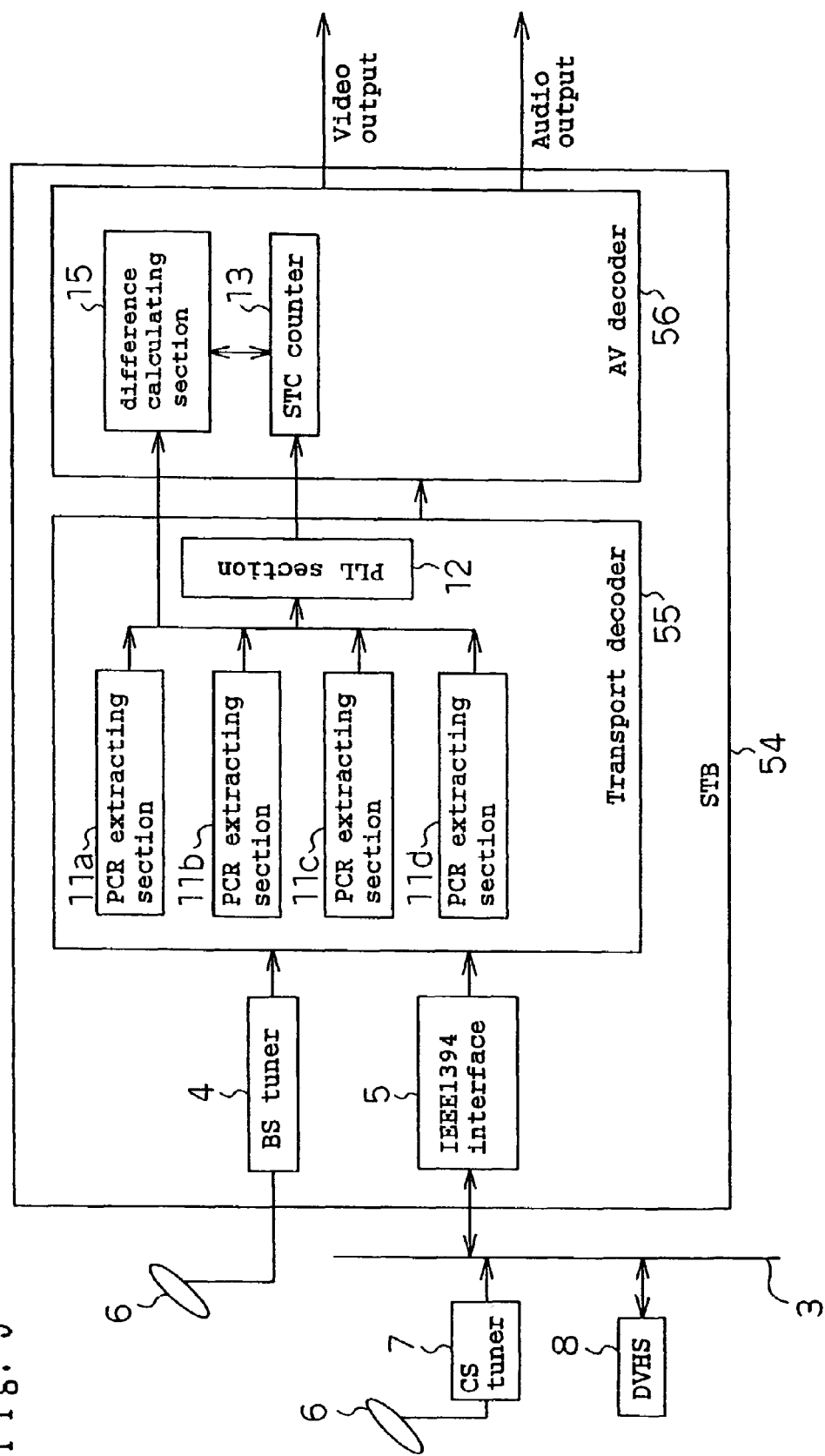
FIG. 9 is a block diagram showing the configuration of an STB according to the ninth embodiment of the present invention.

FIG. 9 is a block diagram illustrating the configuration of an STB for generating data for performing multichannel display of the present embodiment.

FIG. 12 illustrates an example of a television screen displaying the multichannel display data generated by the STB 54 shown in FIG. 9. The example is identical to those described previously in the first and the second embodiments.

In FIG. 9, the difference from the second embodiment is that the STB 54 comprises four PCR extracting sections 11a-d and a difference calculating section 15. That is, the STB 54 comprises the same number of PCR extracting sections 11a-d as the number of the screens provided on the television screen 65.

The PCR extracting sections 11a-d are means for extracting PCR from the AV data of all channels displayed on the main screen 66 and the subsidiary screens 67-69 of the television screen 65.

The PLL section 12 is means for establishing PLL synchronization with the channel displayed on the main screen 66. In other words, the PLL section 12 is means for synchronizing the oscillation frequency with that of the oscillator of 27-MHz frequency used by the encoder in the broadcasting station as a time standard during the encoding of the data.

The STC counter 13 is means for reproducing the time of the channel displayed on the main screen 66, using the 27-MHz clock signal obtained by the PLL section 12 and the PCR value of the channel displayed on the main screen 66 extracted by the PCR extracting sections 11a-d.

The difference calculating section 15 is means for calculating and retaining the difference between PCR and the time of the channel displayed on the main screen 66 on the arrival of the PCR of the AV data of the channels displayed on the subsidiary screens 67-69.

The operation of the present embodiment is described below with emphasis on the difference from the second embodiment.

In the second embodiment, always, the PCR of the AV data of the channel displayed on the main screen was extracted and the channel displayed on the main screen was PLL-synchronized. And, always, the time of the channel displayed on the main screen was reproduced and only the AV data of the channel displayed on the main screen was expanded in AV synchronization.

In the present embodiment, the PCR extracting sections 11a-d always extract the PCR of the all channels of the main screen 66 and the subsidiary screens 67-69. That is, the PCR extracting section 11a extracts the PCR of the AV data of the channel displayed on the main screen 66. The PCR extracting section 11b extracts the PCR of the AV data of the channel displayed on the subsidiary screen 67. The PCR extracting section 11c extracts the PCR of the AV data of the channel displayed on the subsidiary screen 68. The PCR extracting section 11d extracts the PCR of the AV data of the channel displayed on the subsidiary screen 69.

The PLL section 12 always establishes PLL synchronization with the channel displayed on the main screen 66.

The STC counter 13 reproduces the time of the channel displayed on the main screen 66.

The difference calculating section 15 calculates the difference between PCR and the time currently indicated by the STC counter 13 at the time of the extraction of the PCR of the channels displayed on the subsidiary screens 67-69.

Referring to the time indicated by the STC counter 13, the AV decoder 56 expands the AV data of the channel displayed on the main screen 66 in AV synchronization and converts it to analog signals.

The AV decoder 56 also establishes AV synchronization with the channels displayed on the subsidiary screens 67-69. That is, the AV decoder 56 determines the timing of process by comparing the time stamp of the AV data with the sum of the time indicated by the STC counter 13 and the difference calculated and retained in the difference calculating section 15. As such, the AV data of the channels displayed on the subsidiary screens 67-69 is expanded and converted to analog signals in AV synchronization, assuming the sum of the value in the STC counter 13 and the difference retained in the difference calculating section 15 as the time of the channel.

In the present embodiment, the AV decoder 56 can always expand the AV data of the all channels displayed on the main screen 66 and the subsidiary screens 67-69 in AV synchronization and convert them to analog signals. Therefore, immediate channel changing between the main screen 66 and any one of the subsidiary screens 67-69 is realizable, though the scale of the apparatus becomes somewhat larger than that of the second embodiment.

Tenth Embodiment

The tenth embodiment is described below with reference to FIGS. 10 and 12.

Figure 10:
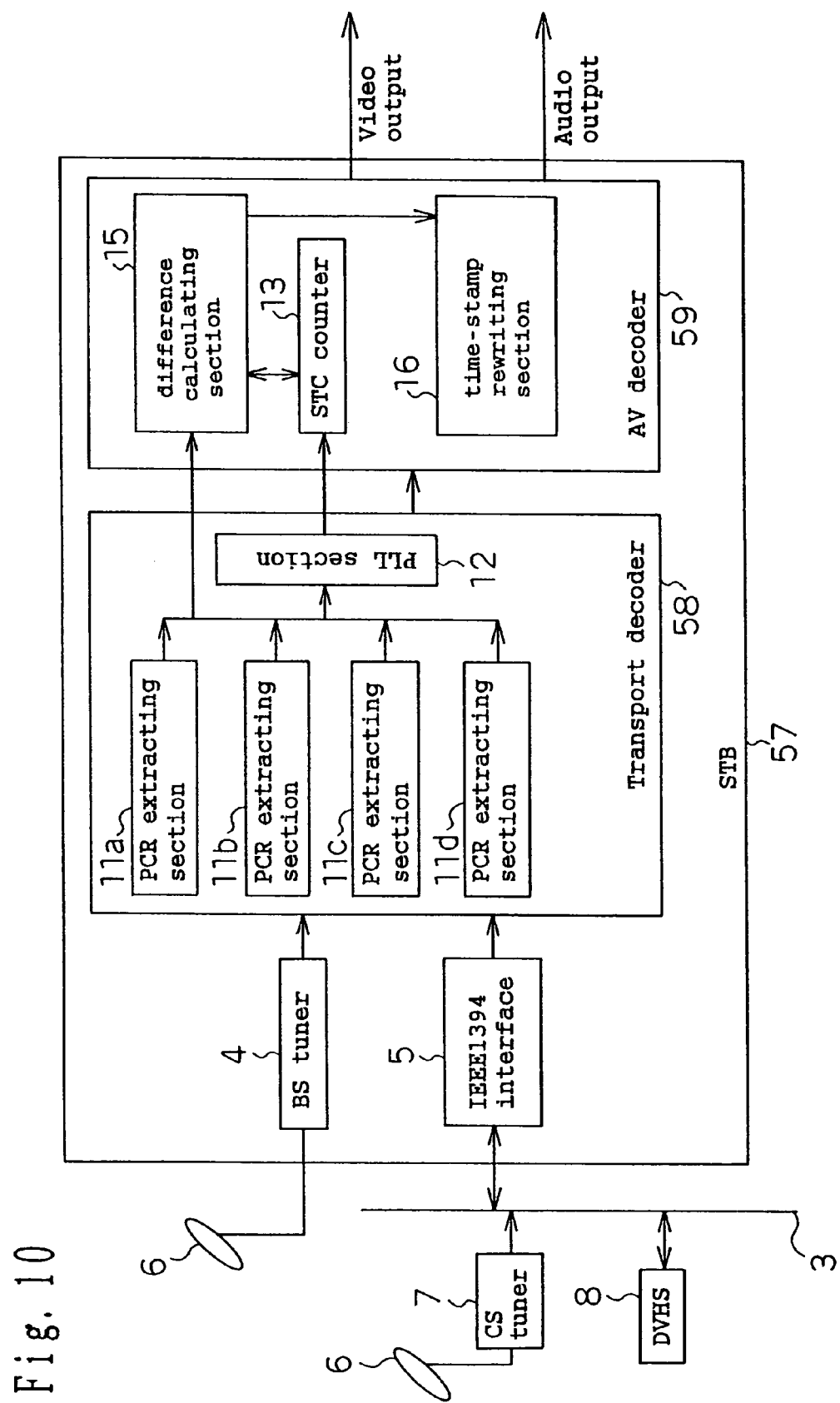
FIG. 10 is a block diagram showing the configuration of an STB according to the tenth embodiment of the present invention.

FIG. 10 is a block diagram illustrating the configuration of an STB for generating data for performing multichannel display of the present embodiment.

FIG. 12 illustrates an example of a television screen displaying the multichannel display data generated by the STB 57 shown in FIG. 10. The example is identical to those described previously in the first and the second embodiments.

In FIG. 10, the difference from the second embodiment is that the STB 57 comprises four PCR extracting sections 11a-d, a difference calculating section 15, and a time-stamp rewriting section 16. That is, the STB 57 comprises the same number of PCR extracting sections 11a-d as the number of the screens provided on the television screen 65.

The PCR extracting sections 11a-d are means for extracting PCR from the AV data of all channels displayed on the main screen 66 and the subsidiary screens 67-69 of the television screen 65.

The PLL section 12 is means for establishing PLL synchronization with the channel displayed on the main screen 66. In other words, the PLL section 12 is means for synchronizing the oscillation frequency with that of the oscillator of 27-MHz frequency used by the encoder in the broadcasting station as a time standard during the encoding of the data.

The STC counter 13 is means for reproducing the time of the channel displayed on the main screen 66, using the 27-MHz clock signal obtained by the PLL section 12 and the PCR value of the channel displayed on the main screen 66 extracted by the PCR extracting sections 11a-d.

The difference calculating section 15 is means for calculating and retaining the difference between PCR and the time of the channel displayed on the main screen 66 on the arrival of the PCR of the AV data of the channels displayed on the subsidiary screens 67-69.

The time-stamp rewriting section 16 is means for converting the time stamps of the AV data of the channels displayed on the subsidiary screens 67-69 into the time of the channel displayed on the main screen 66 using the difference retained in the difference calculating section 15 and for rewriting it.

The operation of the present embodiment is described below with emphasis on the difference from the second embodiment.

In the second embodiment, always, the PCR of the AV data of the channel displayed on the main screen was extracted and the channel displayed on the main screen was PLL-synchronized. And, always, the time of the channel displayed on the main screen was reproduced and only the AV data of the channel displayed on the main screen was expanded in AV synchronization.

In the present embodiment, the PCR extracting sections 11a-d always extract the PCR of the all channels of the main screen 66 and the subsidiary screens 67-69. That is, the PCR extracting section 11a extracts the PCR of the AV data of the channel displayed on the main screen 66. The PCR extracting section 11b extracts the PCR of the AV data of the channel displayed on the subsidiary screen 67. The PCR extracting section 11c extracts the PCR of the AV data of the channel displayed on the subsidiary screen 68. The PCR extracting section 11d extracts the PCR of the AV data of the channel displayed on the subsidiary screen 69.

The PLL section 12 always establishes PLL synchronization with the channel displayed on the main screen 66.

The STC counter 13 reproduces the time of the channel displayed on the main screen 66.

The difference calculating section 15 calculates the difference between PCR and the time currently indicated by the STC counter 13 at the time of the extraction of the PCR of the channels displayed on the subsidiary screens 67-69.

Further, the time-stamp rewriting section 16 rewrites a time stamp into the value of the time stamp of the AV data subtracted by the difference for corresponding one of the channels displayed on the subsidiary screens 67-69 retained in the difference calculating section 15.

Referring to the time indicated by the STC counter 13, the AV decoder 59 expands the AV data of the channel displayed on the main screen 66 in AV synchronization and converts it to analog signals.

The AV decoder 59 also establishes AV synchronization with the channels displayed on the subsidiary screens 67-69. That is, the AV decoder 56 determines the timing of process by comparing the time indicated by the STC counter 13 with the rewritten time stamp. As such, the time of the AV data of the channels displayed on the subsidiary screens 67-69 can be converted to the time of the channel displayed on the main screen 66, by rewriting the time stamp. Thus, the AV data of the channels displayed on the subsidiary screens 67-69 can be expanded and converted to analog signals in AV synchronization with the single STC counter 13.

In the present embodiment, the AV decoder 59 can always expand the AV data of the all channels displayed on the main screen 66 and the subsidiary screens 67-69 in AV synchronization and convert them to analog signals. Therefore, immediate channel changing between the main screen 66 and any one of the subsidiary screens 67-69 is realizable, though the scale of the apparatus becomes somewhat larger than that of the second embodiment.

Eleventh Embodiment

The eleventh embodiment is described below with reference to FIG. 16.

Figure 16:
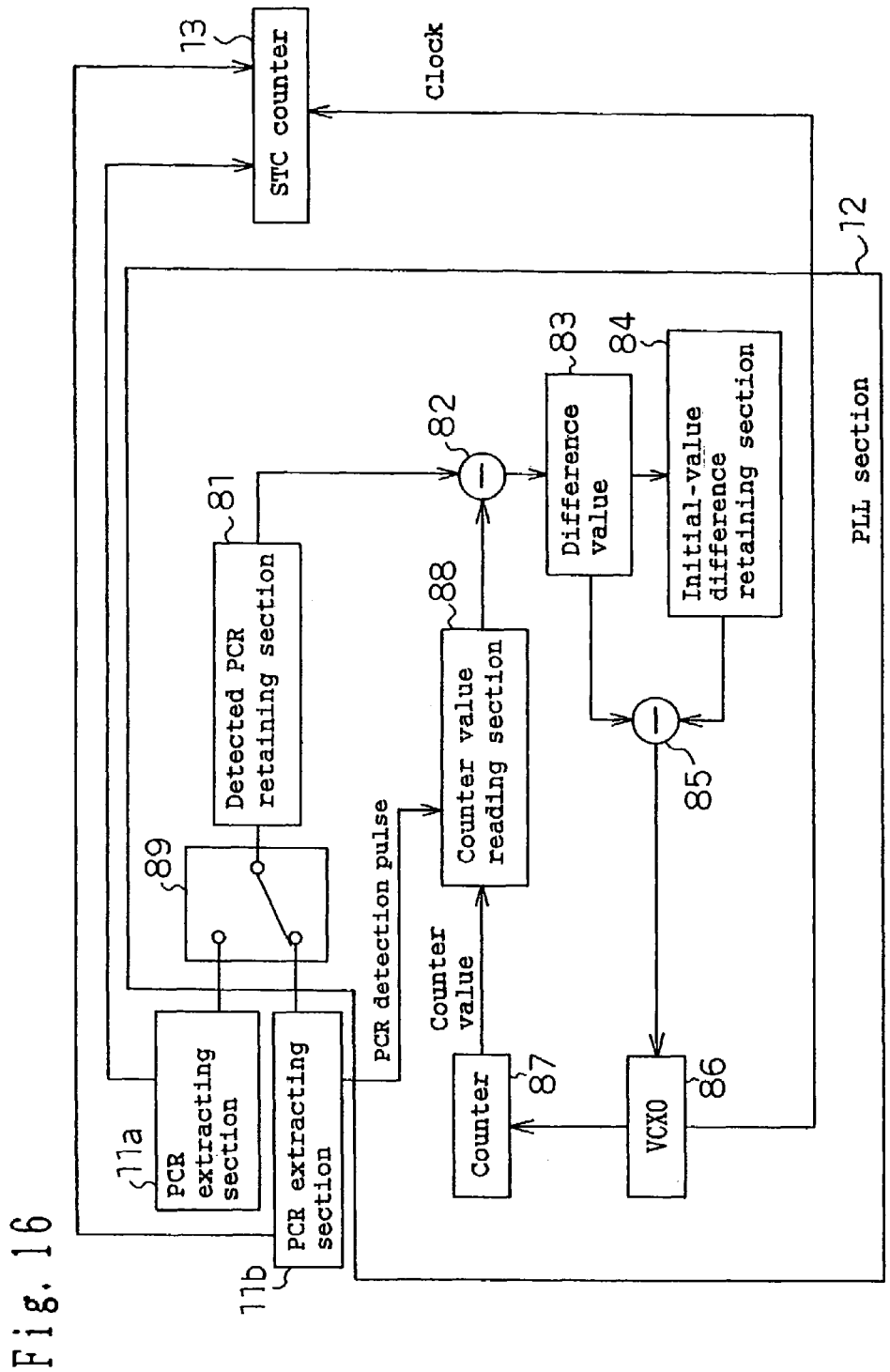
FIG. 16 is a block diagram showing the configuration of a PLL section according to the eleventh embodiment of the present invention.
Figure 17:
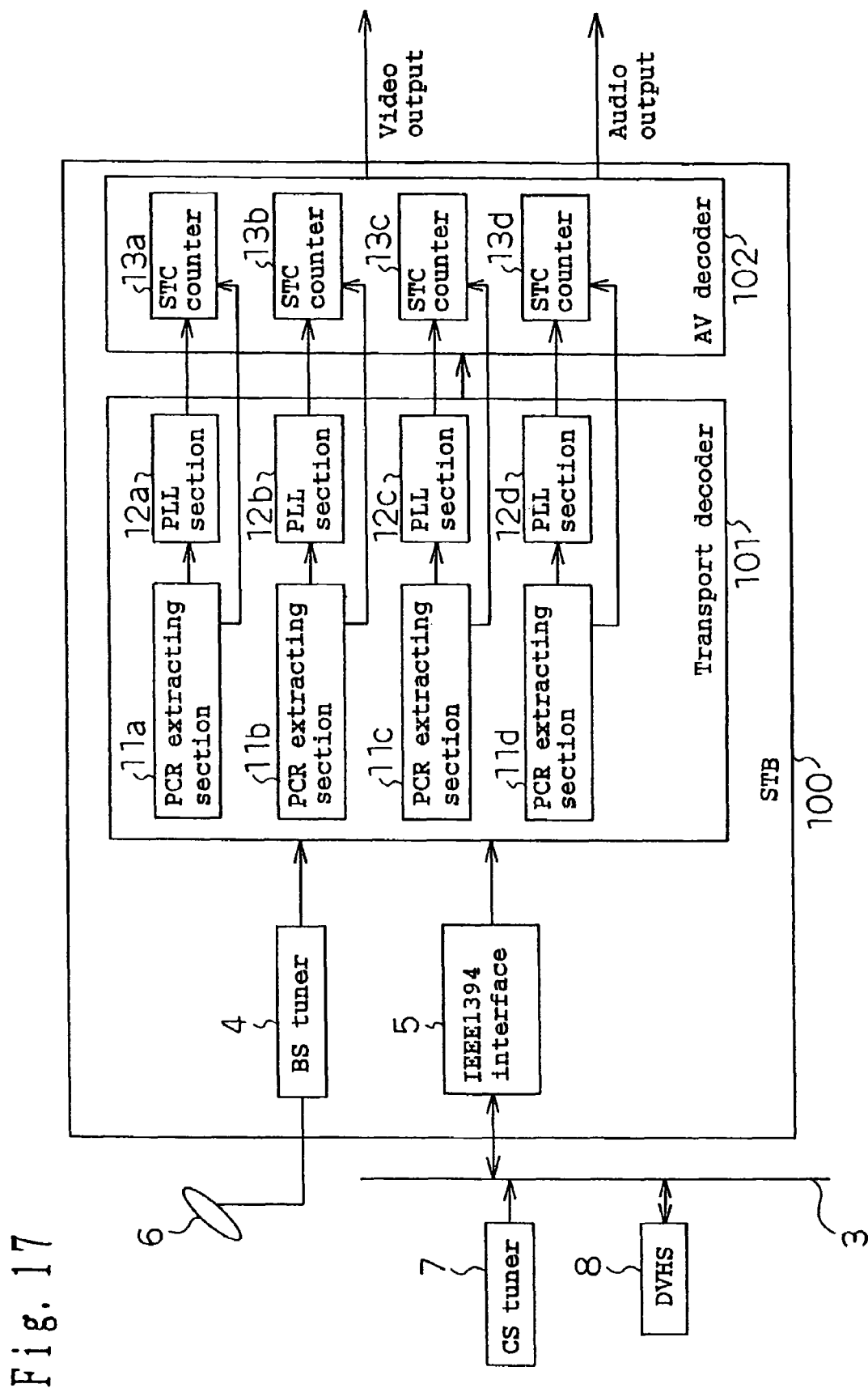
FIG. 17 is a block diagram showing the configuration of a prior-art STB for generating multichannel display data.
Figure 18:
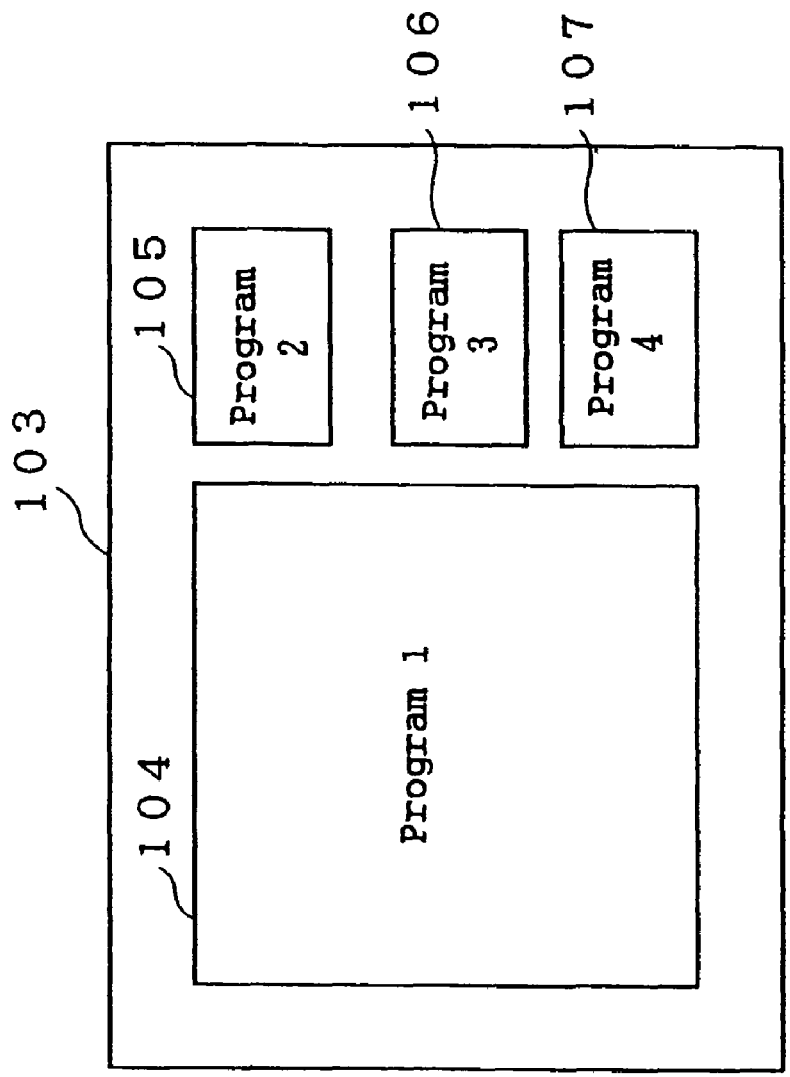
FIG. 18 illustrates an example of a television screen according to prior art.

FIG. 16 is a block diagram showing the configuration of a PLL section 12.

Such a PLL section 12 can be used as a PLL section provided in the STB's described in the first to the tenth embodiments.

The PLL section 12 comprises a detected PCR retaining section 81, a subtracting section 82, a difference value 83, an initial-value difference retaining section 84, a subtracting section 85, a voltage controlled oscillator 86, a counter 87, a counter value reading section 88, and a changing switch 89.

The PLL section 12 is connected to two PCR extracting sections 11a, 11b and an STC counter 13.

The detected PCR retaining section 81 is means for reading and retaining the value of the PCR detected by any one of the PCR extracting sections 11a, 11b. The subtracting section 82 is means for subtracting the detected PCR value from the counter value at the time of the PCR detection. The initial-value difference retaining section 84 is means for retaining the difference value between the counter value at the time of the initial detection of the PCR from the AV data of a channel and the current counter value. The subtracting section 85 is means for subtracting the difference value 83 from the value retained in the initial-value difference retaining section 84.

The voltage controlled oscillator 86 is an oscillator for changing the oscillation frequency so as to reduce the absolute value output from the subtracting section 85. The counter 87 is means for counting the time using the clock signal generated by the voltage controlled oscillator 86.

The counter value reading section 88 is means for reading the counter value indicated by the counter 87 in the timing of the PCR detection by the PCR extracting section 11*b*. The changing switch 89 is means for changing the channel the PCR of the AV data of which is extracted.

The operation of present embodiment is described below.

Assume that the PLL section 12 has established PLL synchronization with the PCR extracted by the PCR extracting section 11*a*. Further assume that the PLL section 12 starts to establish PLL synchronization with the PCR of a new channel other than the PCR having been extracted by the PCR extracting section 11*a*, because the channel to be displayed on the screen has been changed or because the channels displayed on the main screen and a subsidiary screen have been changed with each other.

In this case, the changing switch 89 stops to read the PCR from the PCR extracting section 11*a* and newly starts to read the PCR extracted by the PCR extracting section 11*b*.

When the PCR extracting section 11*b* extracts the first PCR, the detected PCR retaining section 81 reads and retains the first detected PCR value. At the same time, in the timing of the first detection of PCR, the PCR extracting section 11*b* generates a pulse signal indicating the detection of PCR. In the timing that the PCR detection pulse arrives, the counter value reading section 88 reads the counter value indicated by the counter 87. The subtracting section 82 then calculates the difference between the first detected PCR value retained in the detected PCR retaining section 81 and the counter value read by the counter value reading section 88. The difference value 83 is retained in the initial-value difference retaining section 84.

When the PCR extracting section 11*b* extracts the second PCR, the detected PCR retaining section 81 reads and retains the second detected PCR value. At the same time, in the timing of the first detection of PCR, the PCR extracting section 11*b* generates a pulse signal indicating the detection of PCR. In the timing that the PCR detection pulse arrives, the counter value reading section 88 reads the counter value indicated by the counter 87. The subtracting section 82 then calculates the difference between the PCR value retained in the detected PCR retaining section 81 and the counter value read by the counter value reading section 88. The subtracting section 85 calculates the difference between the difference value 83 and the difference value retained in the initial-value difference retaining section 84. The voltage controlled oscillator 86 changes the oscillation frequency so as to reduce the absolute value of the difference value calculated by the subtracting section 85.

Further, when the PCR extracting section 11*b* extracts the third or subsequent PCR, similar process is conducted. The subtracting section 85 calculates the difference between the difference value 83 of the third or subsequent PCR and the difference value retained in the initial-value difference retaining section 84. The voltage controlled oscillator 86 changes the oscillation frequency so as to reduce the absolute value of the difference value calculated by the subtracting section 85.

As such, based on the detected PCR, the PLL section 12 establishes PLL synchronization.

The STC counter 13 loads the PCR value extracted by the PCR extracting section 11*b*, and counts up the value using the clock signal generated by the voltage controlled oscillator 86. As such, the STC counter 13 reproduces the time of the channel.

The STC counter 13 may load the PCR of the AV data of a channel other than the channel the PCR value of which is extracted by the PCR extracting section 11*b*. That is, the STC counter 13 loads the PCR value extracted by the PCR extracting section 11*a* and counts up the value using the clock signal generated by the voltage controlled oscillator 86.

Such configuration is applicable in a case of the first to the tenth embodiments when the number of the PLL sections is smaller than the number of the channels from which PCR is extracted by a PCR extracting section.

As such, the PLL section 12 retains the difference value of the initial value, calculates the difference value between this difference value and the difference value between the PCR value and the counter value, and changes the oscillation frequency so as to reduce the absolute value of the difference value. Therefore, the PLL section 12 establishes a stable PLL synchronization even when the PCR value read by the PLL section 12 has changed to that of a completely different line because of channel changing or channel exchanging between the main screen and a subsidiary screen.

In the description of the first to the tenth embodiments, it was assumed that each channel displayed on each screen has a different PCR from that of another channel.

However, one MPEG transport stream being broadcast from a broadcasting station is normally multiplexed with the AV data of a plurality of channels. In that case, different channels belonging to the same MPEG transport stream may have a common PCR. As such, there is a case that the PCR differs from an MPEG transport stream to another, not from a channel to another. In such a case, the description of the first to the tenth embodiments shall read as follows.

That is, the description that a time-sharing PCR extracting section extracts the PCR, channel by channel, from a channel displayed on the television screen shall read that the time-sharing PCR extracting section extracts the PCR, stream by stream, from the MPEG transport stream to which the channel displayed on the television screen belongs.

The description that the PCR of a channel depends on a time standard different from that of another channel shall read that the PCR of a channel included in a MPEG transport stream depends on a time standard different from that of another MPEG transport stream.

The description that an STC counter reproduces the time of the channel displayed on the main screen shall read that the STC counter reproduces the time of a channel included in the MPEG transport stream to which the channel displayed on the main screen belongs.

The description that an STC counter reproduces the time of the channel displayed on a subsidiary screen shall read that the STC counter reproduces the time of a channel included in the MPEG transport stream to which the channel displayed on the subsidiary screen belongs.

The description that a PCR extracting section extracts the PCR of the channel displayed on the main screen shall read that the PCR extracting section extracts the PCR of a channel included in the MPEG transport stream to which the channel displayed on the main screen belongs.

The description that a PCR extracting section extracts the PCR of the channel displayed on a candidate subsidiary screen for the next main screen shall read that the PCR extracting section extracts the PCR of a channel included in the MPEG transport stream to which the channel displayed on the candidate subsidiary screen for the next main screen belongs.

The description that an STC counter reproduces the time of the channel displayed on a candidate subsidiary screen for the next main screen shall read that the STC counter reproduces the time of a channel included in the MPEG transport stream to which the channel displayed on the candidate subsidiary screen for the next main screen belongs.

The description that a PLL section establishes PLL synchronization with the channel displayed on the main screen shall read that the PLL section establishes PLL synchronization with a channel included in the MPEG transport stream to which the channel displayed on the main screen belongs.

Further, it is possible that the PCR provided in the AV data differs from a broadcasting station to another broadcasting station. That is, one broadcasting station may broadcast programs simultaneously using a plurality of transponders, or one broadcasting station may broadcast programs using only a potion of the transmission band of a transponder. Then, the broadcasting station may provide a common PCR to all of the AV data being broadcast from the broadcasting station. As such, there is a case that the PCR differs from an MPEG transport stream to another form a broadcasting station to another, not from a channel to another. In such a case, the description of the first to the tenth embodiments shall read as follows.

That is, the description that a time-sharing PCR extracting section extracts the PCR, channel by channel, from a channel displayed on the television screen shall read that the time-sharing PCR extracting section extracts the PCR, station by station, from the channel displayed on the television screen belong.

The description that the PCR of a channel depends on a time standard different from that of another channel shall read that the PCR of a channel belonging to a broadcasting station depends on a time standard different from that of another broadcasting station.

The description that an STC counter reproduces the time of the channel displayed on the main screen shall read that the STC counter reproduces the time of a channel of the broadcasting station to which the channel displayed on the main screen belongs.

The description that an STC counter reproduces the time of the channel displayed on a subsidiary screen shall read that the STC counter reproduces the time of a channel of the broadcasting station to which the channel displayed on the subsidiary screen belongs.

The description that a PCR extracting section extracts the PCR of the channel displayed on the main screen shall read that the PCR extracting section extracts the PCR of a channel of the broadcasting station to which the channel displayed on the main screen belongs.

The description that a PCR extracting section extracts the PCR of the channel displayed on a candidate subsidiary screen for the next main screen shall read that the PCR extracting section extracts the PCR of a channel of the broadcasting station to which the channel displayed on the candidate subsidiary screen for the next main screen belongs.

The description that an STC counter reproduces the time of the channel displayed on a candidate subsidiary screen for the next main screen shall read that the STC counter reproduces the time of a channel of the broadcasting station to which the channel displayed on the candidate subsidiary screen for the next main screen belongs.

The description that a PLL section establishes PLL synchronization with the channel displayed on the main screen shall read that the PLL section establishes PLL synchronization with a channel of the broadcasting station to which the channel displayed on the main screen belongs.

The PCR extracting section of the present embodiment is an example of the PCR extracting means of the present invention. The time-sharing PCR extracting section of the present embodiment is an example of the PCR extracting means of the present invention. The PLL section of the present embodiment is an example of the PLL means of the present invention. The STC counter of the present embodiment is an example of the STC means counter of the present invention. The AV decoder of the present embodiment is an example of the AV decoding means of the present invention and also serves as the output means of the present invention. The difference calculating section of the present embodiment is an example of the difference calculating means of the present invention. The time-stamp rewriting means of the present embodiment is an example of the time-stamp rewriting section of the present invention. Further, the television screen of the present embodiment is an example of the multiscreen of the present invention. The MPEG transport stream of the present embodiment is an example of a predetermined transmission unit of the present invention. The broadcasting station of the present embodiment is an example of a predetermined transmission unit of the present invention. The channel of the present embodiment is an example of a predetermined transmission unit of the present invention.

Figure 13:
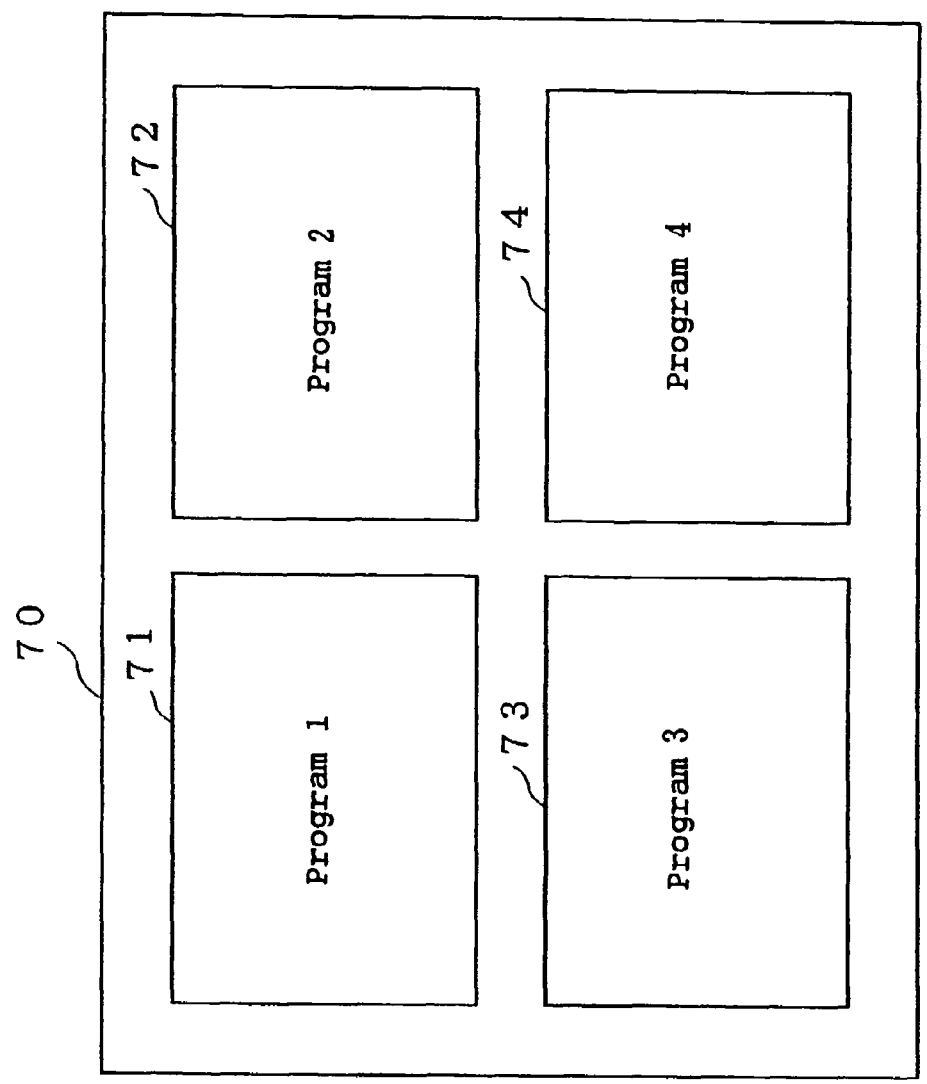
FIG. 13 illustrates an example of a television screen of the first to the tenth embodiments of the present invention.
Figure 14:
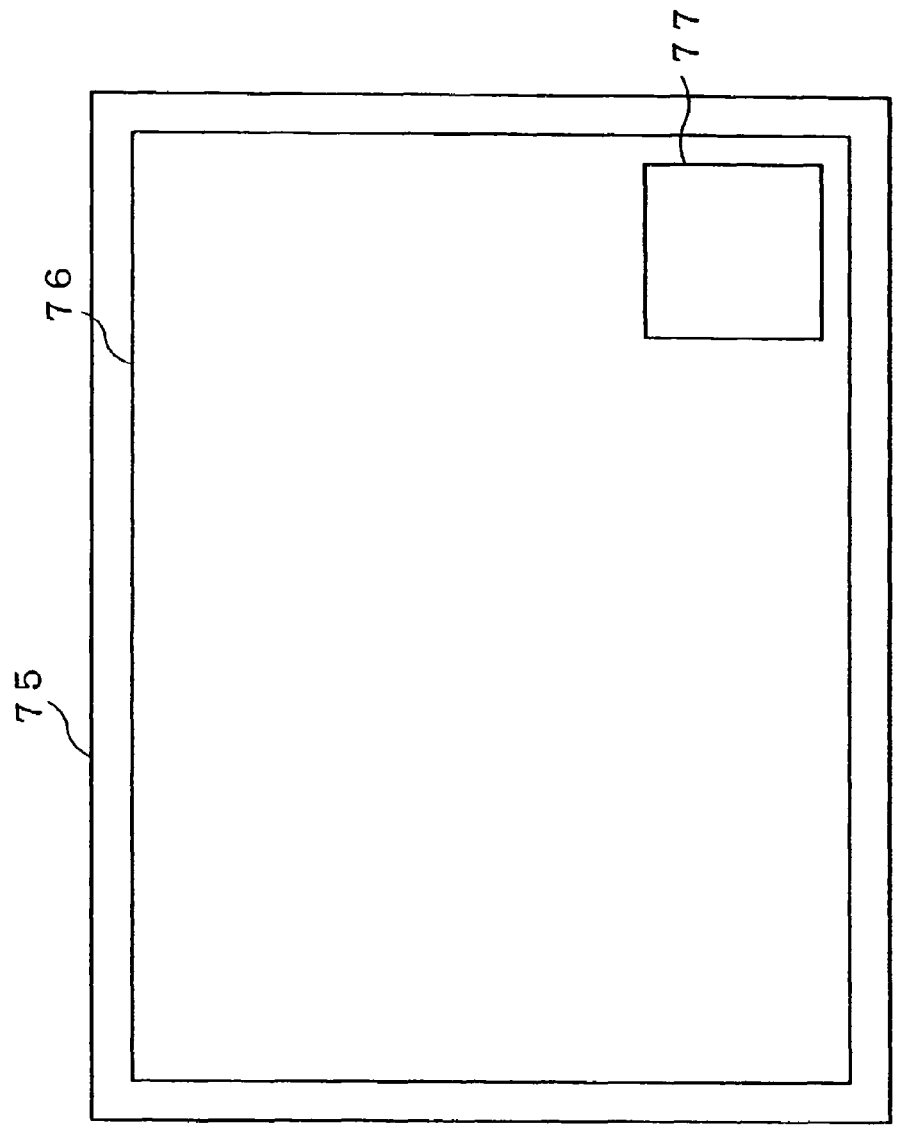
FIG. 14 illustrates an example of a television screen of the first to the tenth embodiments of the present invention.
Figure 15:
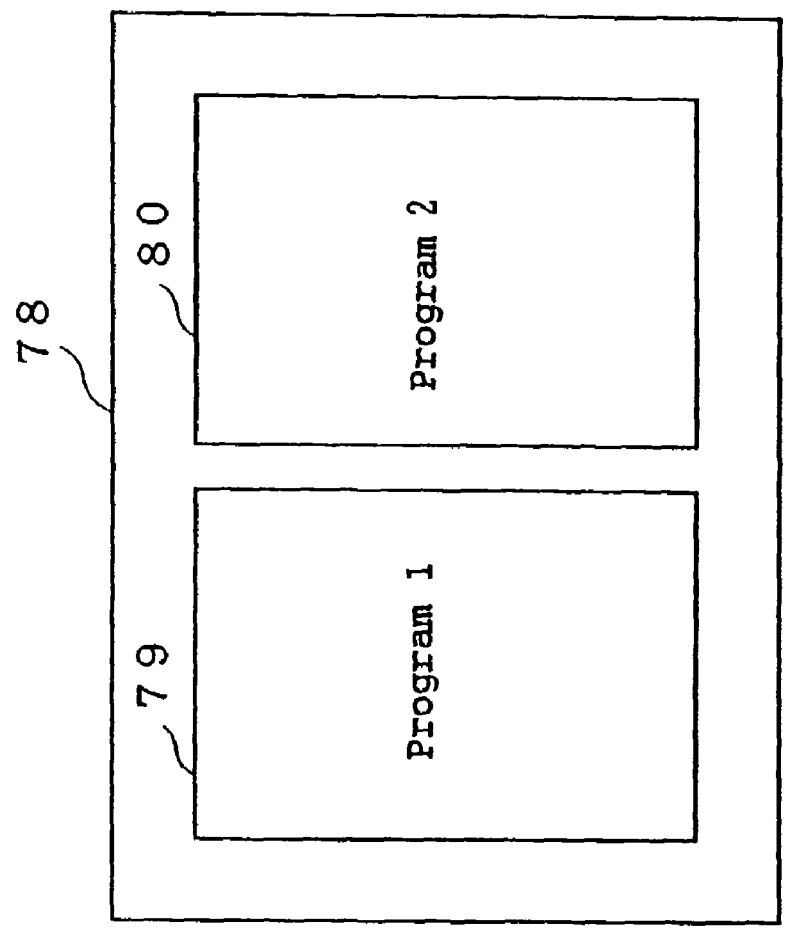
FIG. 15 illustrates an example of a television screen of the first to the tenth embodiments of the present invention.

In the description of the first to the tenth embodiments, it was assumed that the display was performed as the television screen 65 shown in FIG. 12, but the present invention is not restricted to this case. The display may be performed as a television screen 70 shown in FIG. 13. On the television screen 70, a main screen 71 and subsidiary screens 72-74 are identical in size. Further, the display may be performed as a television screen 75 shown in FIG. 14. On the television screen 75, a subsidiary screen 77 is displayed within a main screen 76. The display may further be performed as a television screen 78 shown in FIG. 15. The television screen 78 consist of two screens, and the main screen 79 and the subsidiary screen 80 are identical in size. In this case, the candidate subsidiary screen for the next main screen 79 is always the subsidiary screen 80. In summary, the television screen of the present invention may be a television screen comprising a main screen and any number of subsidiary screens the layout of which is free in position and shape.

In the description of the first to the tenth embodiments comprising a single PLL section, it was assumed that PLL synchronization was established with the channel displayed on the main screen, but the present invention is not restricted to this case. Even in a case of a single PLL section, PLL synchronization may be established with a channel other than the channel displayed on the main screen. For example, in a case that the main screen 71 of the television screen 70 shown in FIG. 13 displays a teletext broadcast, lip synchronization for the main screen is unnecessary. And, assume that the subsidiary screen 72 displays a hi-vision broadcast. In that case, it is preferable to establish PLL synchronization with the channel displayed on the subsidiary screen 72 for decoding the AV data in AV synchronization. In summary, PLL synchronization and AV synchronization may be principally established with a channel requiring a better quality.

In the description of the present embodiment, it was assumed that the PLL section shown in FIG. 16 was used in the first to the tenth embodiments, but the present invention is not restricted to this case. Another PLL section may be used.

Further, the scope of the present invention includes a configuration in which a PCR extracting section and a time-sharing PCR extracting section are used in combination. For example, a configuration is possible in which a PCR extracting means always extracts the PCR form the AV data of the channel displayed on the main screen and a time-sharing PCR extracting section extracts the PCR from all the channels displayed on the subsidiary screens.

All or a portion of the function of all or a portion of means of the multichannel display data generating apparatus of the present invention may be implemented with hardware, or it may be implemented with software using a computer program.

The scope of the present invention includes a medium which is able to be processed by a computer and carrying a program and/or data for executing with a computer all or a portion of the function of all or a portion of means of the multichannel display data generating apparatus of the present invention.

The scope of the present invention includes an informational set which is a program and/or data for executing with a computer all or a portion of the function of all or a portion of means of the multichannel display data generating apparatus of the present invention.

The scope of the data of the present invention includes data structure, data format, and data type. The scope of the medium of the present invention includes a recording medium such as a ROM, a transferring medium such as the Internet, and a transferring medium such as light, radio waves, and sound waves. The scope of the carrying medium of the present invention includes, for example, a recording medium in which a program and/or data is recorded and a transferring medium for transferring a program and/or data. "Being able to be processed by a computer" in the present invention includes "being able to be read with a computer" in case of a recording medium such as a ROM and "being able to be processed by a computer after the transfer of the program and/or data" in case of a transferring medium. The scope of the informational set of the present invention includes, for example, software such as a program and data.

Further, a program recording medium recording a program and/or data for executing with a computer all or a portion of the function of all or a portion of means of an STB described in any one of the above-mentioned embodiments may be a program recording medium which is able to be processed by a computer and wherein said program and/or data read cooperates with said computer to execute said function.

As is obviously recognized by the description, the present invention can provide a multichannel display data generating apparatus having a small circuitry size, and a program recording medium.

What is claimed is:

1. A multichannel display data generating apparatus for generating data for displaying AV data of plurality of channels on a multiscreen comprising a main screen for displaying the video of AV data the voice of which is output to a main speaker and a subsidiary screen for displaying the video of AV data the voice of which is not output to a main speaker, said apparatus comprising:
    input means configured to input AV data of a plurality of channels being transferred using a transport packet of a transport stream;
    the same number of PCR extracting means which are configured to extract the PCR of the channels displayed on said main screen and said subsidiary screen among said plurality of channels as the number of screens of said multiscreen;
    one PLL means configured to establish PLL synchronization with the channel displayed on said main screen by using said extracted PCR;
    the same number of STC counter means which are configured to count the times of the channels displayed on said main screen and said subsidiary screen by using the oscillation frequency of said PLL means as the number of screens of said multiscreen;
    AV decoding means configured to AV-decode the AV data of the channels displayed on said main screen and said subsidiary screen in AV synchronization with said STC counter means and for AV-decoding the AV data of the channel displayed on said subsidiary screen out of AV synchronization; and
    output means configured to output said AV-decoded AV data; and wherein
    said output AV data is displayed on said multiscreen, and wherein
    the channel displayed on said subsidiary screen is displayed without a PCR which is used to synchronize a) audio for the channel displayed on said subsidiary screen, to b) video for the channel displayed on said subsidiary screen.

2. A multichannel display data generating apparatus in accordance with claim 1, wherein
    said PCR extracting means are further configured to extract the PCR of the channel displayed on said main screen among said plurality of channels and to extract the PCR of the channel displayed on said subsidiary screen for a predetermined duration when a new channel is selected and the AV data of the channel is firstly displayed on said subsidiary screen,
    said STC counter means are further configured to count the time of the channel displayed on said main screen by using an oscillation frequency of said PLL means and to reproduce the time of the channel displayed on said subsidiary screen by using the PCR for a predetermined duration when a new channel is selected and the AV data of the channel is firstly displayed on said subsidiary screen, and
    said AV decoding means is further configured to AV-decode the AV data of the channel displayed on said main screen in synchronization with said STC counter means and to AV-decode the AV data of the channel displayed on said subsidiary screen in AV synchronization with the AV data of the channel for a predetermined duration when a new channel is selected and the AV data of the channel is firstly displayed on said subsidiary screen.

3. A multichannel display data generating apparatus in accordance with claim 1, wherein
    if one or more channels displayed on the main and subsidiary screens are broadcast by the same broadcast station, the one or more channels have identical PCR,
    said PCR extracting means is further configured to extract in a time-sharing mode the PCR for each broadcast station which broadcasts the channels displayed on the main and subsidiary screens,
    said PLL means is further configured to establish said PLL synchronization with the channels of the broadcasting stations to which the channels displayed on the main and subsidiary screens belong, and
    said STC counter means is further configured to reproduce the times of the channels of the broadcasting stations to which the channels displayed on the main and subsidiary screens belong.

4. A multichannel display data generating apparatus for generating data for displaying AV data of a plurality of channels on a multiscreen comprising a main screen for displaying the video of AV data the voice of which is output to a main speaker and a subsidiary screen for displaying the video of AV data the voice of which is not output to a main speaker, said apparatus comprising;
    input means configured to input AV data of a plurality of channels being transferred using a transport packet of a transport stream;
    PCR extracting means configured to firstly extract a PCR of the channel displayed on said main screen among said plurality of channels and, if the channel displayed on said main screen changes, to secondly extract a PCR of the changed channel displayed on said main screen;

PLL means configured to establish PLL synchronization by using said extracted PCR;

STC counter means configured to count the time of the channel displayed on said main screen by using the oscillation frequency of said PLL means;

AV decoding means configured to AV-decode the AV data of the channel displayed on said main screen in AV synchronization with aid STC counter means and for AV-decoding the AV data of the channel displayed on said subsidiary screen out of AV synchronization; and output means configured to output said AV-decoded AV data, wherein said output AV data is displayed on said multiscreen, the channel displayed on said subsidiary screen is displayed without a PCR which is used to synchronize a) audio for the channel displayed on said subsidiary screen, to b) video for the channel displayed on said subsidiary screen, said PLL means comprises a counter for counting by using the oscillation frequency generated by an oscillator provided therein, calculates and retains a first difference between the value of the PCR of a channel to be PLL-synchronized firstly extracted by said PCR extracting means and the counter value of said counter at the time of the extraction of the PCR by said PCR extracting means, calculates a second difference between the value of the PCR of said channel to be PLL-synchronized secondly or subsequently extracted by said PCR extracting means and the counter value of said counter at the time of the extraction of the PCR by said PCR extracting means, and controls the oscillation frequency so as to reduce the difference between said first difference and said second difference.

5. A multichannel display data generating apparatus in accordance with claim 4, wherein if one or more channels displayed on the main and subsidiary screens are broadcast by the same broadcast station, the one or more channels have identical PCR, said PCR extracting means is further configured to extract in a time-sharing mode the PCR for each broadcast station which broadcasts the channels displayed on the main and subsidiary screens, said PLL means is further configured to establish said PLL synchronization with the channels of the broadcasting stations to which the channels displayed on the main and subsidiary screens belong, and said STC counter means is further configured to reproduce the times of the channels of the broadcasting stations to which the channels displayed on the main and subsidiary screens belong.

6. A multichannel display data generating apparatus in accordance with claim 4, wherein said PCR extracting means are further configured to extract the PCR of the channel displayed on said main screen among said plurality of channels and to extract the PCR of the channel displayed on said subsidiary screen for a predetermined duration when a new channel is selected and the AV data of the channel is firstly displayed on said subsidiary screen, said STC counter means are further configured to count the time of the channel displayed on said main screen by using an oscillation frequency of said PLL means and to reproduce the time of the channel displayed on said subsidiary screen by using the PCR for a predetermined duration when a new channel is selected and the AV data of the channel is firstly displayed on said subsidiary screen, and said AV decoding means is further configured to AV-decode the AV data of the channel displayed on said main screen in synchronization with said STC counter means and to AV-decode the AV data of the channel displayed on said subsidiary screen in AV synchronization with the AV data of the channel for a predetermined duration when a new channel is selected and the AV data of the channel is firstly displayed on said subsidiary screen.

* * * * *